United States Patent
Takase et al.

[11] Patent Number: 5,817,383
[45] Date of Patent: Oct. 6, 1998

[54] SUBSTRATE OF ELECTRODE FOR LIQUID CRYSTAL

[75] Inventors: Junji Takase; Kazuto Hosono; Koji Shimizu, all of Settsu; Sadao Fujii, Kobe, all of Japan

[73] Assignee: Kanegafuchi Kagaku Kogyo Kabushiki Kaisha, Osaka, Japan

[21] Appl. No.: 693,256

[22] PCT Filed: Feb. 22, 1995

[86] PCT No.: PCT/JP95/00257

§ 371 Date: Aug. 19, 1996

§ 102(e) Date: Aug. 19, 1996

[87] PCT Pub. No.: WO95/23353

PCT Pub. Date: Aug. 31, 1995

[30] Foreign Application Priority Data

Feb. 24, 1994 [JP] Japan ................................. 6-052897
Aug. 11, 1994 [JP] Japan ................................. 6-212020

[51] Int. Cl.⁶ .................................................. G02F 1/1343
[52] U.S. Cl. ................................................ 428/1; 349/158
[58] Field of Search .................................. 349/158; 428/1

[56] References Cited

U.S. PATENT DOCUMENTS

| | | | |
|---|---|---|---|
| 4,982,014 | 1/1991 | Freitag et al. | 528/196 |
| 5,041,521 | 8/1991 | Serini et al. | 528/176 |
| 5,086,159 | 2/1992 | Fritsch et al. | 528/204 |
| 5,126,428 | 6/1992 | Freitag et al. | 528/196 |
| 5,227,458 | 7/1993 | Freitag et al. | 528/196 |

FOREIGN PATENT DOCUMENTS

| | | |
|---|---|---|
| 0 414 083 A2 | 2/1991 | European Pat. Off. . |
| 0 443 058 A1 | 8/1991 | European Pat. Off. . |
| 60-247620 | 12/1985 | Japan . |
| 61-41122 | 2/1986 | Japan . |
| 1-124821 | 5/1989 | Japan . |

OTHER PUBLICATIONS

Patent Abstracts of Japan, vol. 13, No. 322 (P–902), 20 Jul. 1989, and JP 01 090418, 6 Apr. 1989.

*Primary Examiner*—Alexander Thomas
*Attorney, Agent, or Firm*—Armstrong, Westerman, Hattori, McLeland & Naughton

[57] ABSTRACT

A substrate of electrode for liquid crystal which comprises a substrate film for liquid crystal comprising an aromatic polyester or a polycarbonate which contains, as a bisphenol component, at least one selected from the group consisting of 1,1-bis(4-hydroxyphenyl)-alkylcycloalkane, 1,1-bis(3-substituted-4-hydroxyphenyl)-alkylcycloalkane and 1,1-bis(3,5-substituted-4-hydroxyphenyl)-alkylcycloalkane, and a transparent electrode for liquid crystal which is provided on at least one surface of the film. It has a high heat resistance, a low retardation and a low variation of the retardation thereof with heating.

26 Claims, No Drawings

SUBSTRATE OF ELECTRODE FOR LIQUID CRYSTAL

TECHNICAL FIELDS

The present invention relates to a substrate of electrode for liquid crystal which comprises a substrate film for liquid crystal and a transparent electrode. More particularly the present invention relates to a substrate of electrode for liquid crystal which employs an aromatic polyester or a polycarbonate containing the particular bisphenol component, as a substrate film for liquid crystal.

BACKGROUND ART

In recent years, electronic instruments are more and more downsized. Liquid crystal displays have been used widely as display portions of lap-top-type personal computers, word processors, portable information instrument terminals, and the like, by making the best use of their features such as lightness, compactness and low energy consumption. As substrate of the transparent electrode for elements of liquid crystal display, though glass has been conventionally used, the use of plastic substrates is now being studied in view of their features such as breakage resistance and lightness.

In case that plastic films are used as the substrates of the transparent electrodes, one of their drawbacks is a low heat resistivity. Namely, in order to obtain high reliability of finally assembled cell, it is necessary to heat up to around 150° C. in the step of assembling the liquid crystal cell, e.g. applying and drying of an orientated membrane and sealing of the cell. Also, for portable instruments, wide liquid crystal displays have been increasingly used, and the STN display has been used in addition to the TN-type display. As for the STN, a phase differential film is used to cancel coloring trouble. If the phase differential film and a transparent electrically conductive film can be integrated, the construction can be conveniently simplified. However, in this case, if the films do not have a particularly higher heat resistance, the products cannot be used because restoration of retardation occurs at the time of assembling of the liquid crystal cell.

Further, when using as substrate films for liquid crystal, the contrast turns bad if a substrate having a low retardation is not used. The retardation is represented by a product of a film thickness d and a birefringence Δn. Such films are obtained by melt extrusion or solution casting. As the substrate film, one having good surface properties is desirable, and for this purpose, it is desirable to be produced according to the solution casting. The retardation is, however, raised when a certain tension is applied during the drying step of the casted film.

Also, at the time of the cell assembling, sealing is achieved around the cell by using adhesives under heating, and, in some cases, with respect to the above-mentioned substrate film of electrode for liquid crystal, there remains a tension therein due to heat-shrinkage, so that the retardation sometimes appears. When the retardation appears, it is not preferable since the contrast of the liquid crystal cell fades away. Accordingly, preferred materials are those in which retardation is not increased even when a tension applies thereto.

For these requirements, polyethylene terephthalate or polycarbonate is proposed as a material of the plastic substrate film (Y. Umeda, T. Miyashita, and F. Nakano, "Liquid Crystal Plastic Substrates" p. 178, in SID Simp. Dig. Tech. Papers, P. 178, 1982).

However a usual biaxally-orientated film of polyethylene terephthalate has a strict orientation, and thus cannot be used for the liquid crystal cell, since color development happens at the time when inserted between polarizing plates. Also, when using a uniaxially-orientated film of polyethylene terephthalate for avoiding this trouble, it is necessary to conform the optical axis to that of the polarizing plate, and further since its heat resistance is below 100° C., the processing step of cell assembling can take place only under remarkably specific conditions.

On the other hand, with respect to the polycarbonate for the substrate film for liquid crystal, a usual bisphenol A type polycarbonate has been examined. However, since a Tg thereof is around 150° C., a processing temperature is limited up to around 130° to 140° C. Accordingly in the liquid crystal cell assembling steps, a drying temperature of the orientated membrane and a curing temperature of a sealing agent are restricted. In case that a phase differential film is prepared by uniaxial-stretching, the processing temperature is also restricted up to around 130° to 140° C., taking into consideration of restoration of retardation at the heat treatment.

The present inventors have found the fact that, when using an aromatic polyester and/or polycarbonate which contains, as a bisphenol component, at least one selected from the group consisting of 1,1-bis(4-hydroxyphenyl)-alkylcycloalkane, 1,1-bis(3-substituted-4-hydroxyphenyl)-alkylcycloalkane and 1,1-bis(3,5-substituted-4-hydroxyphenyl)-alkylcycloalkane, there can be provided a substrate film for liquid crystal which has a high glass transition temperature and thus is excellent in heat resistance, and is inhibited in increase of retardation even if a tension is applied at the drying step, and further has a small restoration of retardation at the heat treatment, and then the present invention has been completed.

DISCLOSURE OF THE INVENTION

The invention relates to a substrate of electrode for liquid crystal which comprises a substrate film for liquid crystal comprising an aromatic polyester which contains, as a bisphenol component, at least one selected from the group consisting of 1,1-bis(4-hydroxyphenyl)-alkylcycloalkane, 1,1-bis(3-substituted-4-hydroxyphenyl)-alkylcycloalkane and 1,1-bis(3,5-substituted-4-hydroxyphenyl)-alkylcycloalkane (hereinafter, in some cases, referred to as "particular bisphenol") (hereinafter, in some cases, said aromatic polyester being referred to as "particular aromatic polyester"), and a transparent electrode for liquid crystal which is provided on at least one surface of the film.

Also, the present invention relates to a substrate of electrode for liquid crystal in which a mixture of the above-mentioned particular aromatic polyester and a polycarbonate is used as the substrate film for liquid crystal.

Further, the present invention relates to a substrate of electrode for liquid crystal in which a substrate film for liquid crystal comprising the particular aromatic polyester or a mixture thereof with a polycarbonate, and having a retardation of not more than 20 nm measured under unloaded condition is used.

Also, the present invention relates to a substrate of electrode for liquid crystal in which a substrate film for liquid crystal is used, and the substrate film comprises a phase differential film comprising the particular aromatic polyester or a mixture thereof with a polycarbonate and having a retardation of 100 to 1,200 nm measured under unloaded condition.

Furthermore, the present invention relates to a substrate of electrode for liquid crystal which comprises a substrate film for liquid crystal comprising a polycarbonate which contains the above-mentioned particular bisphenol (hereinafter, in some cases, referred to as "particular polycarbonate") as a bisphenol component, and a transparent electrode provided on at least one surface of the film.

A conventional polycarbonate may be used in addition to the particular polycarbonate.

Also, the substrate film for liquid crystal may be a film having a retardation of not more than 20 nm measured under unloaded condition, and may also be a phase differential film having a retardation of 100 to 1,200 nm measured under unloaded condition.

BEST MODE FOR CARRYING OUT THE INVENTION

According to the substrate of electrode for liquid crystal of the present invention, there is used the above-mentioned particular aromatic polyester or the particular polycarbonate containing the particular bisphenol as a material of the substrate film.

The particular aromatic polyester and the particular polycarbonate containing the particular bisphenol used in the present invention are known, and are described in Japanese Unexamined Patent Publication No. 88634/1990 and Japanese Unexamined Patent Publication No. 233720/1990. However, there is no disclosure in both publications as to use of the particular aromatic polyester or the particular polycarbonate for the substrate film for liquid crystal, and of course, they are silent as to the characteristics of retardation.

The particular bisphenol used in the invention is at least one selected from the group consisting of 1,1-bis(4-hydroxyphenyl)-alkylcycloalkane, 1,1-bis(3-substituted-4-hydroxyphenyl)-alkylcycloalkane and 1,1-bis(3,5-substituted-4-hydroxyphenyl)-alkylcycloalkane, as described above. As the alkylcycloalkane residue, preferable is, for instance, a cycloalkane group of 5 to 8 carbon atoms, preferably 5 to 6 carbon atoms wherein 1 to 12 of, preferably 2 to 8 of hydrogen atoms are substituted with alkyl groups of 1 to 6 carbon atoms, preferably 1 to 4. Also, as the substituent at 3- or 5-position of 4-hydroxyphenyl, for instance, an alkyl group of 1 to 6 carbon atoms, preferably 1 to 2 carbon atoms or a halogen atom is preferable.

Examples of the 1,1-bis(4-hydroxyphenyl)-alkylcycloalkane (hereinafter, in some cases, referred to as "bisphenol (I)" which is one of the particular bisphenol used in the present invention are, for instance, 1,1-bis(4-hydroxyphenyl)-3,3,5-trimethylcyclohexane, 1,1-bis(4-hydroxyphenyl)-3,3-dimethyl-5,5-dimethylcyclohexane, 1,1-bis(4-hydroxyphenyl)-3,3-dimethyl-4-methylcyclohexane, 1,1-bis(4-hydroxyphenyl)-3,3-dimethyl-5-methylcyclopentane, and the like. Particularly, 1,1-bis(4-hydroxyphenyl)-3,3,5-trimethylcyclohexane is preferable because of its industrial utilization.

Examples of the 1,1-bis(3-substituted-4-hydroxyphenyl)-alkylcycloalkane (hereinafter, in some cases, referred to as "bisphenol (II)") which is another particular bisphenol used in the invention are, for instance, 1,1-bis(3-methyl-4-hydroxyphenyl)-3,3,5-trimethylcyclohexane, 1,1-bis(3-ethyl-4-hydroxyphenyl)-3,3-dimethyl-5,5-dimethylcyclohexane, 1,1-bis(3-chloro-4-hydroxyphenyl)-3,3-dimethyl-4-methylcyclohexane, 1,1-bis(3-bromo-4-hydroxyphenyl)-3,3-dimethyl-5-methylcyclopentane, and the like.

Examples of the 1,1-bis(3,5-substituted-4-hydroxyphenyl)-alkylcycloalkane (hereinafter, in some cases, referred to as "bisphenol (III)") which is another particular bisphenol used in the invention are, for instance, 1,1-bis(3-methyl-4-hydroxyphenyl)-3,3,5-trimethylcyclohexane, 1,1-bis(3,5-dichloro-4-hydroxyphenyl)-3,3-dimethyl-5-methylcyclohexane, 1,1-bis(3-ethyl-5-methyl-4-hydroxyphenyl)-3,3,5-trimethylcyclohexane, 1,1-bis(3,5-dimethyl-4-hydroxyphenyl)-3,3,5-trimethylcyclohexane, 1,1-bis(3,5-dimethyl-4-hydroxyphenyl)-3,3-dimethyl-5-methylcyclopentane, and the like.

The particular aromatic polyester in the invention is obtainable by polymerizing with the particular bisphenol. The polymerization reaction is carried out under conventional polymerization conditions through melt-polymerization such as transesterification method, solution-polymerization such as interfacial condensation method, or the like.

As the bisphenol component, there may be used the particular bisphenol (one or more) alone, or a mixture with one or more of other bisphenols.

In cases that two or more of the particular bisphenols are used together, they may be selected from each bisphenol (I), (II) or (III), or by combining two or more of the bisphenols (I), (II) and (III). The mixing ratio is optional.

Examples of the other bisphenols used together with the particular bisphenol are, for instance, 2,2'-bis(4-hydroxyphenyl)propane, 4,4'-(α-methylbenzylidene)bisphenol, bis(4-hydroxyphenyl)methane, 2,2'-bis(4-hydroxyphenyl)butane, 3,3'-bis(4-hydroxyphenyl)pentane, 4,4'-bis(4-hydroxyphenyl)heptane, 4,4'-bis(4-hydroxyphenyl)-2,5-dimethylheptane, bis(4-hydroxyphenyl)methylphenylmethane, bis(4-hydroxyphenyl)diphenylmethane, 2,2'-bis(4-hydroxyphenyl)octane, bis(4-hydroxyphenyl)-4-fluorophenylmethane, 2,2'-bis(3-fluoro-4-hydroxyphenyl)propane, bis(3,5-dimethyl-4-hydroxyphenyl)methane, 2,2'-bis(3,5-dimethyl-4-hydroxyphenyl)propane, bis(3,5-dimethyl-4-hydroxyphenyl)phenylethane, bis(3-methyl-4-hydroxyphenyl)diphenylmethane, bis(3,5-dimethyl-4-hydroxyphenyl)sulfone, or a mixture of two or more of them.

The above-mentioned other bisphenols can be used up to 50% by mole preferably up to 30% by mole of the total bisphenol component, and may be selected so as to have properties suitable to the liquid crystal system to be used.

As the acid component, there are terephthalic acid, isophthalic acid, and the like. Particularly, it is preferable to use terephthalic acid alone, isophthalic acid alone, or a mixture of terephthalic acid and isophthalic acid in such a point that they are readily available.

The particular aromatic polyester used in the invention has a glass transition temperature of not less than 180° C., and a weight-average molecular weight (polystyrene basis) measured by gel permeation chromatography (GPC) of 30,000 to 250,000, preferably 40,000 to 200,000.

The substrate film for liquid crystal used in the invention is obtainable by molding one or more of the particular aromatic polyesters according to extrusion molding or solution casting. The solution casting is preferable in views of uniformity of the film thickness and good surface properties. Suitable examples of the solvents are, for instance, methylene chloride, chloroform, toluene, dimethyl formamide, N-methyl pyrrolidone, and the like.

The blended composition of the particular aromatic polyester and other polymers may be used as the material of the substrate film for liquid crystal. As the other polymers, there are employed the above-mentioned particular polycarbonate, a conventionally known polycarbonate, a polyesterpolycarbonate and the like, and a bisphenol A type polycarbonate is preferable in view of commercial availability and cost.

The blending ratio is desirably set to such a ratio that the Tg of the blended composition is not less than 180° C., preferably not less than 200° C. in view of heat resistance. For instance, in case of the particular aromatic polyester/the known polycarbonate (for instance, the known polycarbonate being the bisphenol A type polycarbonate), it is desirable to blend not more than 100 parts by weight, preferably about 80 to 0 part by weight of the known polycarbonate with 100 parts by weight of the particular aromatic polyester.

In case that a substrate film for liquid crystal is produced according to the solution casting in industrial scale, for instance, the film is prepared by casting a polymer solution on an endless steel belt, drying until a film becomes self-supporting (usually, an amount of the residual solvent being around 40 to 1%), and then removing the residual solvent through a roll-conveying drying oven or the like. At the time of passing through the drying oven, a drawing tension is applied to the film. It is not avoidable that this tension becomes to around 1 kgf/m width in consideration of the mechanical loss due to friction against the roll and the like, and thus a retardation of the film increases since the polymer film orientates during the heat-drying process under such a tension. However, in case that the above-mentioned particular polycarbonate film is used, such increasing of the retardation can be inhibited.

Thickness of the film is generally within the range of several μm to several hundreds μm, more preferably 10 to 300 μm.

The thus obtained substrate film for liquid crystal has a retardation, measured under unloaded condition, of not more than 20 nm, desirably not more than 15 nm, further desirably not more than 10 nm.

In this invention, the substrate film for liquid crystal may be the phase differential film. The phase differential film has a retardation of 100 to 1,200 nm, desirably of 200 to 800 nm, and is generally obtainable by stretching the above-mentioned dried film uniaxially. The stretching may be uniaxial stretching in the traverse direction or uniaxial stretching in the longitudinal direction, and is preferable to employ the uniaxial stretching in the longitudinal direction taking into consideration of visual angle. Stretching temperature is within the range from a temperature lower than a glass transition temperature (Tg) of the film by 20° C., preferably by 10° C. to a temperature higher than the Tg by 30° C., preferably by 20° C. In order to prevent irregular color development upon the cell driving, it is preferable to control the difference of retardation values within the same surface area into not more than 10 nm, preferably not more than 5 nm.

The substrate film for liquid crystal composed of the particular aromatic polyester used in the present invention is characterized in such a point that variation of the retardation and of the surface resistance are small.

In the substrate of electrode for liquid crystal of the invention, a transparent electrode is provided on at least one surface of the substrate film for liquid crystal. As the transparent electrode, there are employed a metal such as platinum, gold, silver, copper or nickel, a single oxide such as tin oxide, indium oxide or cadmium oxide, a complex metal oxide such as tin oxide/antimony, indium oxide/tin or zinc oxide/aluminum, and the like. As the forming method, there can be utilized physical deposition methods such as vacuum vapor deposition method, sputtering method and ion-plating method, chemical deposition methods such as CVD method and sol-gel method.

Also, the substrate of electrode for liquid crystal of the present invention may, if necessary, have a barrier layer on one or both sides of the substrate film to protect from penetration of water, oxygen or nitrogen, and to improve its solvent resistance. Examples of the barrier layer are layers prepared by laminating with a film of an organic polymer compound such as polyvinylalcohol, ethylene-vinylalcohol copolymer, polyacrylonitrile, acrylonitrile-methyl acrylate copolymer or polyvinylidene chloride, by coating with a solution thereof, by depositing an inorganic material such as $SiO_2$, SiC, SiAl ON or SiN according to physical deposition methods such as vapor deposition and CVD, a layer of commercially available silicon type- or acrylic type- hard coat, and the like. Thickness of the barrier layer is generally 0.5 to 50 μm, preferably 1 to 30 μm in case of the organic barrier layer, and is 10 to 150 nm, preferably 20 to 100 nm in case of the inorganic barrier layer.

Further, an undercoat layer may also be provided between the barrier layer and the film. Various kinds of solvents or materials containing these solvents such as an alkali (inorganic or organic) are used when washing in the steps of assembling the liquid crystal cell, when applying of orientated membrane, or when forming or removing the photoresist in patterning of ITO. The kind of the above-mentioned solvents and materials containing the solvent to be used varies with manufacturers. And, processing conditions (for instance, period of time for dipping into the solvent, and the like) also varies with panel manufacturers. Since the solvent sometimes penetrates between the barrier layer and the film substrate to reduce adhesion between the barrier layer and the film substrate, in such a case, the adhesion can be improved by provision of the undercoat layer. Thickness of the undercoat layer is generally 0.01 to 10 μm, preferably 0.02 to 5 μm. The undercoat layer is formed, for instance, by applying a silane coupling agent, a silicone hard coat, an epoxy resin, an epoxy acrylate, an isocyanate compound, or the like.

The present invention further relates to a substrate of electrode for liquid crystal which is constructed by a transparent electrode which is provided on at least one surface of the substrate film for liquid crystal containing at least one of the particular polycarbonate with above-mentioned particular bisphenol.

The particular polycarbonate may be prepared by polymerizing one or more of the particular bisphenols or the mixture of the bisphenol and the other bisphenol according to general polymerization method such as melt transesterification method or interfacial polycondensation method under general polymerization conditions.

In case that two or more of the particular bisphenols are used together, they may be selected from each bisphenol (I), (II) or (III), or by combining the bisphenols (I), (II) and (III) with each other. The mixing ratio is optional. Also, other bisphenols may be used together with the particular bisphenol. Examples of the other bisphenols are the bisphenols mentioned before as the bisphenols of the particular aromatic polyesters.

The other bisphenols may be used up to 60% by mole, preferably up to 40% by mole of the particular bisphenol. When more than 60% by mole, a film having a low retardation and excellent heat resistance and small variation of retardation after heating cannot be obtained.

Also, as a molecular weight controlling agent, there may be used one or more of monofunctional compounds such as phenol, para-t-butylphenol, para-nonylphenol and para-methoxyphenol.

The particular polycarbonate used in the present invention has a glass transition temperature (Tg) of not less than 18° C. and a weight-average molecular weight (polystyrene basis) measured by gel permeation chromatography (GPC) of 30,000 to 200,000, preferably 40,000 to 150,000.

The substrate film for liquid crystal used in the invention is obtainable by molding one or more of the particular polycarbonates according to extrusion molding or solution casting. The solution casting is preferable in views of uniformity of the film thickness and good surface properties. Suitable examples of the solvents are, for instance, methylene chloride, chloroform, toluene, dimethyl formamide, N-methyl pyrrolidone, and the like.

Blended composition of the particular polycarbonate and other polymer may also be used as the material of the substrate film for liquid crystal. Examples of the other polymer are the above-mentioned aromatic polyesters, conventionally known polycarbonates, and the like.

Examples of the conventionally known polycarbonate are, for instance, bisphenol A type polycarbonate, and the like.

The blending ratio is desirably set to such a ratio that the Tg of the blended composition is not less than 180° C., preferably not less than 200° C. in view of heat resistance. For instance, in case of the particular polycarbonate/the known polycarbonate (for instance, the known polycarbonate being the bisphenol A type polycarbonate), it is preferable to blend not more than 100 parts by weight, preferably about 60 to 0 part by weight of the known polycarbonate with 100 parts by weight of the particular polycarbonate.

In case that a substrate film for liquid crystal is produced according to the solution casting in industrial scale, for instance, the film is prepared by casting a polymer solution on an endless steel belt, drying until a film becomes self-supporting (usually, an amount of the residual solvent being around 40 to 1%), and then removing the residual solvent through a roll-conveying drying oven or the like. At the time of passing through the drying oven, a drawing tension is applied to the film. It is not avoidable that this tension comes to around 1 kgf/m width in consideration of the mechanical loss due to friction against the roll and the like, and thus a retardation of the film increases since the polymer film orientates during the heat-drying process under such a tension. However, in case that the above-mentioned particular polycarbonate film is used, such increasing of the retardation can be inhibited.

Thickness of the film is generally within the range of several $\mu$m to several hundreds $\mu$m, more preferably 10 to 300 $\mu$m.

The thus obtained substrate film for liquid crystal has a retardation, measured under unloaded condition, of not more than 20 nm, desirably not more than 15 nm, further desirably not more than 10 nm.

The substrate film for liquid crystal which comprises the particular polycarbonate may also be the phase differential film. With respect to the phase differential film, the technical matters and effects thereof are similar to those of the above-mentioned aromatic polyester film. Also, with respect to the transparent electrode, barrier layer and undercoat layer which are provided on at least one surface of the substrate film for liquid crystal, their technical matters are similar to those of the above-mentioned particular aromatic polyester.

Hereinbelow, the substrate of electrode for liquid crystal of the present invention (in case that the substrate film for liquid crystal is not the phase differential film) and the phase differential substrate of electrode for liquid crystal of the present invention (in case that the substrate film for liquid crystal is the phase differential film) are more specifically explained according to the following Examples. It is to be understood that the present invention is not limited to those Examples.

In general, the substrate of electrode for liquid crystal is manufactured by (a) preparing the polymer for substrate film for liquid crystal, (b) forming (casting) the substrate film for liquid crystal to give the substrate film for liquid crystal, (d) providing the barrier layer (barrier layer for gas, water and the like) on one or both surfaces of the above-mentioned substrate film for liquid crystal, and then (e) providing the transparent electrode for liquid crystal on the above-mentioned barrier layer. There is a case that the undercoat layer is provided between the above-mentioned substrate film and barrier layer.

Also, generally, the phase differential substrate of electrode for liquid crystal is manufactured by forming the substrate film for liquid crystal according to similar methods to the above (a) and (b), then (c) stretching the substrate film for liquid crystal to endow it with phase differential property and to give the phase differential substrate film for liquid crystal, providing the barrier layer according to similar method to the above (d), and then providing the transparent electrode for liquid crystal according to similar method to the above (e). There is a case that the undercoat layer may be provided between the above-mentioned phase differential substrate film for liquid crystal and the barrier layer.

<Examples relating to the aromatic polyester>

EXAMPLE I

Experiments where kind of the bisphenol component is varied.

EXPERIMENTAL NOS. I-1 to I-5

(a) Preparation of polymer for substrate film for liquid crystal

The weight shown in Table I-(1) of the bisphenol component shown in Table I-(1), 1.35 g of para-t-butylphenol, 0.26 g of sodium hydrosulfite, 78.2 ml of aqueous sodium hydroxide solution (5N) and 176.8 ml of water were mixed in a 300 ml eggplant type flask under nitrogen atmosphere, and cooled to 5° C. to prepare an aqueous alkaline solution of dihydric phenol (a1).

Separately, in another 300 ml eggplant type flask replaced with nitrogen, the weight shown in Table I-(1) of the dicarboxylic acid chloride (in case that two dicarboxylic acid chlorides were used, each weight of dicarboxylic acid chlorides) was dissolved in 255 ml of methylene chloride, and was cooled to 5° C. to prepare a methylene chloride solution of the dicarboxylic acid chloride (a2).

After adding 137 ml of water and 0.16 g of benzyltributyl ammonium chloride as the catalyst into a 1 l separable flask, the inside of the flask was replaced with nitrogen, followed by cooling to 5° C., to prepare an aqueous solution of the catalyst (a3).

To the aqueous solution (a3) with strong stirring in the separable flask, the aqueous solution (a1) and the solution (a2) were continuously added at same time for 10 minutes through a pump to give a mixed solution. After stirring the mixed solution for 2 hours, 0.42 g of benzoyl chloride in 5 ml of methylene chloride was added into the mixed solution, and stirring was continued for another 20 minutes.

After the stirring, the solution was allowed to stand until the solution was separated to an aqueous phase containing sodium chloride and sodium hydroxide which were by-produced through the reaction and a methylene chloride phase in which the polymer was dissolved. After decanting this supernatant liquid (aqueous phase), almost the same amount of pure water as that of the decanted aqueous phase was added, and then the solution was stirred. While continuing the stirring, the solution was neutralized with a small amount of hydrochloride. Further, the above-mentioned procedures of decantation, addition of pure water and stirring were repeated five times, the solution was allowed to stand, and then the aqueous phase was decanted. To the obtained methylene chloride solution of the polymer, 300 ml of methylene chloride was added, and this solution was heated to 40° to 50° C. to remove water together with methylene chloride in the solution by azeotropic dehydration. Further, the heating was continued until a polymer concentration of the methylene chloride solution became 15% by weight, and the polymer solution was casted on a glass plate. After allowing to stand for 60 minutes at room temperature, a polymer film was peeled off from the glass plate, and dried for 2 hours at 150° C. with a drier to obtain a film of the aromatic polyester polymer.

Weight-average molecular weight of the above-mentioned polymer was determined by means of GPC measurement with a UV detector (L-4000) of Hitachi, Ltd. and a pump (L-6000), and the column oven (M-556) of Gaschro Industries, Ltd. and a data processor (SIC Labochart 180), and Shodex K-80M of Showa Denko Kabushiki Kaisha as a degassor and column. A calibration curve for this measurement was determined by using monodispersed polystyrenes of Showa Denko Kabushiki Kaisha as a standard polystyrenes (6 classes of molecular weight, i.e. 2880000, 435000, 157000, 66000, 9240 and 1320) (hereinafter, the measuring method of weight-average molecular weight of the polymer being the same). Tg of the above-mentioned polymer was measured with SSC5000 DSC260 of Seiko Instruments Inc. (hereinafter, the measuring method of Tg of the polymer being the same). The results are shown in Table I-(1), respectively.

to pre-drying treatment for 20 minutes at 80° C. to reduce methylene chloride remaining in the polymer film (hereinafter, in some cases, referred to as "residual methylene chloride") to 3% by weight. Thickness of the pre-dried polymer film was 100 $\mu$m.

The pre-dried polymer film was cut to a strip of 5 cm width. One end of this polymer film strip was chucked throughout its width with a face chuck so that the length of the polymer film strip from the chucking portion to another end was 20 cm. The polymer film strip was dried for 15 minutes at the drying temperature (first step) shown in Table I-(2), subsequently for 10 minutes at the drying temperature (second step) shown in Table I-(2), under the condition that the polymer film strip supported by the chuck was hanging down by its own weight (load in drying=0 g).

Another strip of the pre-dried polymer film was prepared by cutting to 5 cm width. Both ends of this polymer film strip were chucked throughout their width respectively with face chucks so that the distance between the chucks was 20 cm. Under such a condition that the polymer film strip was supported at one chucking portion and a load was applied at another chucking portion, 68 g or 135 g of load was applied to the polymer film strip, and the strip was dried for 15 minutes at the drying temperature (first step) shown in Table I-(2), subsequently for 10 minutes at the drying temperature (second step) shown in Table I-(2).

The retardation of the above-mentioned polymer film to which was applied the load of 0 g, 68 g or 135 g at the drying step was measured with a micropolarization spectrophotometer (TFM-120 AFT) of OAK Seisakusho through crossed nicol spectrophotometry by conforming the optical axis of a phase differential plate having a retardation of 450 nm with the optical axis of a sample to be measured and measuring an increased value from that value (retardation) (hereinafter, the measuring method of retardation being the same). The results are shown in Table I-(2), respectively.

(With respect to retardation appeared by applying load to substrate film for liquid crystal)

The above-mentioned polymer film (containing residual methylene chloride) peeled off from the stainless steel plate

TABLE I-(1)

| | | | | | Characteristics of polymer | |
| | Bisphenol component | | Dicarboxylic acid component | | Weight-average | |
| Experimental No. | Kind of Bisphenol | Weight (g) | Terephthalic acid dichloride (g) | Isophthalic acid dichloride (g) | molecular weight (polystyrene basis) | Tg (°C.) |
| --- | --- | --- | --- | --- | --- | --- |
| I-1 | Bisphenol (I)*1 | 45.17 | 15.23 | 15.23 | 55,000 | 275 |
| I-2 | Bisphenol (II)*2 | 49.8 | 15.23 | 15.23 | 52,000 | 270 |
| I-3 | Bisphenol (III)*3 | 53.14 | 15.23 | 15.23 | 52,000 | 272 |
| I-4 | Bisphenol (I)*1 | 45.17 | — | 30.46 | 50,000 | 250 |
| I-5 | Bisphenol A | 33.22 | 15.23 | 15.23 | 62,000 | 195 |

*1 1,1-bis(4-hydroxyphenyl)-3,3,5-trimethylcyclohexane
*2 1,1-bis(3-methyl-4-hydroxyphenyl)-3,3,5-trimethylcyclohexane
*3 1,1-bis(3,5-dimethyl-4-hydroxyphenyl)-3,3,5-trimethylcyclohexane (b) Preparation of substrate film for liquid crystal Fifteen % by weight methylene chloride solution of the above-mentioned polymer was casted uniformly on a stainless steel plate, and allowed to stand for 60 minutes at room temperature to obtain a polymer film (containing methylene chloride) on a stainless steel plate. This polymer film was peeled off from the stainless steel plate.

(With respect to retardation appeared by applying a load at the time of drying the polymer film)

The polymer film peeled off from the stainless steel plate was put on the stainless steel plate again, and was subjected was dried for 15 minutes at the drying temperature (first step) and then for 10 minutes at the drying temperature (second step) shown in Table I-(2) under tension-free condition. Thickness of the dried substrate film for liquid crystal was 100 $\mu$m.

A retardation of the substrate film for liquid crystal was measured (load at the measuring=0 g). The results are shown in Table I-(2). Also, the substrate film for liquid crystal was cut to a strip of 10 mm width. Both ends of this strip of substrate film for liquid crystal were chucked throughout its width with face chucks, respectively, so that the distance between the chucks was 20 cm. The strip of substrate film for liquid crystal was supported at one chucking portion and a load was applied at another chucking portion, and thus 250 g or 500 g of load was applied to the strip of substrate film for liquid crystal. And then, a retardation of the substrate film for liquid crystal was measured under the condition as the above-mentioned load being applied. The results are shown in Table I-(2).

barrier layer, and another for forming a transparent electrode for liquid crystal), wherein the target for forming a barrier layer was $SiO_{1.5}$, and the sputtering was carried out under the conditions that the sputtering gas was argon gas (total gas pressure 1 mTorr, gas flow rate 20 sccm), the power condition was RF400W (2.35 W/cm$^2$) and the treatment time was 1.5 minutes. Thickness of the barrier layer mea-

TABLE I-(2)

| | Retardation appeared by applying load at the time of drying the polymer film (nm) | | | | | Retardation appeared by applying load to substrate film for liquid crystal (nm) | | | | |
|---|---|---|---|---|---|---|---|---|---|---|
| | Drying temperature (°C.) | | Load at the time of drying | | | Drying temperature (°C.) | | Load at the time of measuring | | |
| Experiment No. | First step | Second step | 0 g | 68 g | 135 g | First step | Second step | 0 g | 250 g | 500 g |
| I-1 | 120 | 190 | 0 | 7 | 15 | 120 | 190 | 0 | 11 | 24 |
| I-2 | 120 | 190 | 0 | 8 | 15 | 120 | 190 | 0 | 11 | 24 |
| I-3 | 120 | 190 | 0 | 8 | 16 | 120 | 190 | 0 | 12 | 25 |
| I-4 | 120 | 190 | 0 | 6 | 15 | 120 | 190 | 0 | 10 | 22 |
| I-5 | 120 | 190 | 0 | 22 | 38 | 120 | 190 | 0 | 26 | 49 |

Tendency of the relation between tension (load) and retardation of a product provided with a barrier layer and a transparent electrode on the above-mentioned substrate film (substrate of electrode for liquid crystal) was the same as that of the above-mentioned substrate for liquid crystal, and tendency of variations of the surface electrical resistance and optical permeability due to the heat treatment was the same as that of the phase differential substrate of electrode for liquid crystal described below (the results of the polymer and blended polymers used hereinbelow had the same tendency as the above-mentioned results).

(c) Stretching of substrate film for liquid crystal

The substrate film for liquid crystal having a retardation of 0 nm and a thickness of 100 μm obtained according to the above-mentioned step (b) was cut to a film of 11 cm×11 cm, and the cut film was stretched with a stretching testing machine (X4HD-HT) of TOYO SEIKI SEISAKUSHO to the stretching ratio shown in Table I-(3) at a stretching speed of 10 cm/min (stretching ratio in the direction across to the stretching direction is 1.0) under the stretching temperature shown in Table I-(3), so that the phase differential substrate film for liquid crystal was prepared.

The retardation of the phase differential substrate film for liquid crystal was measured. The results are shown in Table I-(3).

(d) Provision of barrier layer

The barrier layer was provided on one side of the phase differential substrate film for liquid crystal by using a magnetron sputtering machine (HSM-720 type) of SHIMADZU CORPORATION which was equipped with two circular targets of 6 inches diameter (one for forming a sured by SURFCOM 1500A of Kabushiki Kaisha TOKYO SEIMITSU was 30 nm.

(e) Provision of the transparent electrode for liquid crystal

After provision of the barrier layer, the transparent electrode for liquid crystal was provided on the barrier layer by using the same magnetron sputtering machine as used in the provision of the barrier layer, wherein indium oxide (ITO) having a tin oxide content of 10% by weight was used as the target for forming the transparent electrode for liquid crystal, and the sputtering was carried out under the conditions that the sputtering gas was a mixture of argon and oxygen (1% by volume) (total gas pressure 7 mTorr, gas flow rate 20 sccm), the power condition was DC 0.6 A 250V (0.88 W/cm$^2$) and the treatment time was 3 minutes, so that the phase differential substrate of electrode for liquid crystal was obtained. Thickness of the transparent electrode measured by SURFCOM 1500A of Kabushiki Kaisha Tokyo Seimitsu was 100 nm.

Surface electrical resistance and optical permeability of the phase differential substrate of electrode for liquid crystal were measured. Also, after heat-treating this phase differential substrate of electrode for liquid crystal at 180° C. for 1 hour with a precise thermostatic chamber (DF62 type) of YAMATO, and cooling to room temperature, the retardation, surface electrical resistance and optical permeability were measured. Herein, the retardation was measured by the same machine described above, the surface electrical resistance was measured by ROLESTA AP of Mitsubishi Petrochemical Co., Ltd., and optical permeability was measured by NDH-300A of Nippon Denshoku Kogyo. The results are shown in Table I-(3).

TABLE I-(3)

| | | | | Characteristics of phase differential substrate of electrode for liquid crystal | | | | |
|---|---|---|---|---|---|---|---|---|
| | | | | Before heating | | After heating (180° C. × 1 hr) | | |
| Experimental No. | Stretching temperature (°C.) | Stretching ratio | Retardation (nm) | Surface resistance (Ω/□) | Optical permeability (%) | Retardation (nm) | Surface resistance (Ω/□) | Optical permeability (%) |
| I-1 | 275 | 1.4 | 500 | 70 | 80 | 495 | 68 | 81 |
| I-2 | 270 | 1.4 | 490 | 70 | 80 | 485 | 69 | 82 |
| I-3 | 272 | 1.4 | 500 | 72 | 79 | 495 | 70 | 81 |
| I-4 | 250 | 1.4 | 495 | 70 | 80 | 490 | 68 | 82 |
| I-5 | 195 | 1.2 | 480 | 70 | 80 | 460 | 68 | 81 |

According to Experimental No. I-5, since the diol component is different from the particular bisphenol of the aromatic polyester used in the invention, the desirable effects cannot be obtained (the retardation appeared due to tension (load) is large (see Table I-(2)), and the reduction in retardation due to heat treatment is little larger (see Table I-(3)).

EXAMPLE II

Experiments where the aromatic polyester has both the particular bisphenol and the conventional bisphenol as bisphenol components.

EXPERIMENTAL NOS. II-1 to II-5
(Experimental No. II-1 is the same as Experimental No. I-1)

(a) Preparation of polymer for substrate film for liquid crystal

The particular bisphenol, i.e. 1,1-bis(4-hydroxyphenyl)-3,3,5-trimethylcyclohexane and the conventional bisphenol, i. e. bisphenol A, the amounts of which are shown in Table II-(1), 1.35 g of para-t-butylphenol, 0.26 g of sodium hydrosulfite, 78.2 ml of aqueous sodium hydroxide solution (5N) and 176.8 ml of water were mixed in a 300 ml eggplant type flask under nitrogen atmosphere, and cooled to 5° C. to give an aqueous alkaline solution of dihydric phenol (a1).

Separately, a methylene chloride solution of the dicarboxylic acid chloride (a2) comprising terephthalic acid dichloride/isophthalic acid dichloride in a molar ratio of 1/1, and a solution of a catalyst (a3) were prepared in the same manner as in Experimental No. I-1. After mixing the above-mentioned aqueous solution (a3), aqueous solution (a1) and solution (a2) and stirring in the same manner as in Experimental No. I-1, the methylene chloride solution of benzoyl chloride was added in the same amount as in Experimental No. I-1 into the mixture with stirring, and the stirring was continued for another 20 minutes, and then an aromatic polyester polymer was prepared in the same manner as in Experimental No. I-1.

A weight-average molecular weight and Tg of the above-mentioned polymer are shown in Table II-(1).

TABLE II-(1)

| | Bisphenol component*[4] | | Characteristics of polymer | |
|---|---|---|---|---|
| Experimental No. | Bisphenol (I)*[1] (g) | Bisphenol A (g) | Weight-average molecular weight | Tg (°C.) |
| II-1 | 45.17 (100% by mole) | — | 55,000 | 275 |
| II-2 | 40.65 (90% by mole) | 6.64 (10% by mole) | 54,000 | 270 |
| II-3 | 33.87 (75% by mole) | 8.30 (25% by mole) | 51,000 | 260 |
| II-4 | 22.58 (50% by mole) | 16.61 (50% by mole) | 55,000 | 235 |
| II-5 | 18.07 (40% by mole) | 19.93 (60% by mole) | 52,000 | 225 |

*[1]1,1-bis(4-hydroxyphenyl)-3,3,5-trimethylcyclohexane
*[4]The values shown in the parentheses are % by mole of each bisphenol in the whole bisphenol components.

(b) Preparation of substrate film for liquid crystal

A polymer film (containing residual methylene chloride) was prepared in the same manner as in Experimental No. I-1. (With respect to retardation appeared by applying load at the time of drying the polymer film)

The polymer film was dried and the retardation of the polymer film to which the load of 0 g, 68 g or 135 g was applied at the drying step was measured, in the same manner as in Experimental No. I-1 except that the drying temperature shown in Table 11-(2) was employed. The results are shown in Table 11-(2), respectively.

(With respect to retardation appeared by applying load to substrate film for liquid crystal)

The polymer film was dried in the same manner as in Experimental No. I-1 except that the drying temperature shown in Table II-(2) was employed, to give a substrate film for liquid crystal. Also, the retardation of the substrate film for liquid crystal was measured in the same manner as in Experimental No. I-1 by applying the load of 0 g, 250 g or 500 g to substrate film for liquid crystal. The results are shown in Table II-(2), respectively.

TABLE II-(2)

| | Retardation appeared by applying load at the time of drying the polymer film (nm) | | | | | Retardation appeared by applying load to substrate film for liquid crystal (nm) | | | | |
|---|---|---|---|---|---|---|---|---|---|---|
| | Drying temperature (°C.) | | Load at the time of drying | | | Drying temperature (°C.) | | Load at the time of measuring | | |
| Experimental No. | First step | Second step | 0 g | 68 g | 135 g | First step | Second step | 0 g | 250 g | 500 g |
| II-1 | 120 | 190 | 0 | 7 | 15 | 120 | 190 | 0 | 11 | 24 |
| II-2 | 120 | 190 | 0 | 9 | 16 | 120 | 190 | 0 | 12 | 24 |
| II-3 | 120 | 190 | 0 | 11 | 17 | 120 | 190 | 0 | 13 | 27 |
| II-4 | 120 | 190 | 0 | 15 | 29 | 120 | 190 | 0 | 14 | 29 |
| II-5 | 120 | 190 | 0 | 20 | 41 | 120 | 190 | 0 | 20 | 41 |

(c) Stretching of substrate film for liquid crystal

A phase differential substrate film for liquid crystal was prepared and the retardation thereof was measured in the same manner as in Experimental No. I-1 except that the stretching temperature and the stretching ratio shown in Table II-(3) were employed. The results are shown in Table II-(3).

(d), (e) Formation of barrier layer and transparent electrode for liquid crystal A barrier layer and a transparent electrode were formed on one side of the phase differential substrate film for liquid crystal to prepare a phase differential substrate of electrode for liquid crystal in the same manner as in Experimental No. I-1.

A surface electrical resistance and optical permeability of the phase differential substrate of electrode for liquid crystal, and a retardation, surface electrical resistance and optical permeability of the phase differential substrate of electrode for liquid crystal which was heat-treated in the same manner as in Experimental No. I-1 were measured in the same manner as in Experimental No. I-1. The results are shown in Table II-(3).

EXPERIMENTAL NOS. III-1 and III-2

(a) Preparation of polymer for substrate film for liquid crystal

Two kinds of the particular bisphenols shown in Table III-(1), the amounts of which are shown in Table III-(1), 1.35 g of para-t-butylphenol, 0.26 g of sodium hydrosulfite, 78.2 ml of aqueous sodium hydroxide solution (5N) and 176.8 ml of water were mixed in a 300 ml eggplant type flask under nitrogen atmosphere, and cooled to 5° C. to give an aqueous alkaline solution of dihydric phenol (a1).

Separately, a methylene chloride solution of the dicarboxylic acid chloride (a2), and a solution of a catalyst (a3) were prepared in the same manner as in Experimental No. I-1. After mixing the above-mentioned aqueous solution (a3), aqueous solution (a1) and solution (a2) and stirring in the same manner as in Experimental No. I-1, the methylene chloride solution of benzoyl chloride was added in the same amount as in Experimental No. I-1 into the mixture with stirring, and the stirring was continued for another 20 minutes, and then an aromatic polyester polymer was prepared in the same manner as in Experimental No. I-1.

A weight-average molecular weight and Tg of the above-mentioned polymer are shown in Table III-(1).

TABLE II-(3)

| | | | | Characteristics of phase differential substrate of electrode for liquid crystal | | | | |
|---|---|---|---|---|---|---|---|---|
| | | | | Before heating | | After heating (180° C. × 1 hr) | | |
| Experimental No. | Stretching temperature (°C.) | Stretching ratio | Retardation (nm) | Surface resistivity (Ω/□) | Optical permeability (%) | Retardation (nm) | Surface resistivity (Ω/□) | Optical permeability (%) |
| II-1 | 275 | 1.4 | 500 | 70 | 80 | 495 | 68 | 81 |
| II-2 | 270 | 1.4 | 500 | 72 | 80 | 495 | 70 | 80 |
| II-3 | 265 | 1.4 | 510 | 72 | 80 | 505 | 70 | 81 |
| II-4 | 255 | 1.4 | 510 | 71 | 81 | 505 | 70 | 81 |
| II-5 | 245 | 1.4 | 500 | 70 | 80 | 495 | 68 | 82 |

EXAMPLE III

Experiments where the aromatic polyester has two different kinds of the particular bisphenol as bisphenol components

TABLE III-(1)

| Experimental No. | Bisphenol component*4 | | | Characteristics of polymer | |
|---|---|---|---|---|---|
| | Bisphenol (I)*1 (g) | Bisphenol (II)*2 (g) | Bisphenol (III)*3 (g) | Weight-average molecular weight | Tg (°C.) |
| III-1 | 22.58 (50% by mole) | 24.62 (50% by mole) | — | 54,000 | 273 |
| III-2 | 22.58 (50% by mole) | — | 26.66 (50% by mole) | 53,000 | 274 |

*1 1,1-bis(4-hydroxyphenyl)-3,3,5-trimethylcyclohexane
*2 1,1-bis(3-methyl-4-hydroxyphenyl)-3,3,5-trimethylcyclohexane
*3 1,1-bis(3,5-dimethyl-4-hydroxyphenyl)-3,3,5-trimethylcyclohexane
*4 The values shown in the parentheses are % by mole of each bisphenol in the whole bisphenol components.

(b) Preparation of substrate film for liquid crystal

A polymer film (containing residual methylene chloride) was prepared in the same manner as in Experimental No. I-1.
(With respect to retardation appeared by applying load at the time of drying the polymer film)

The polymer film was dried and the retardation of the polymer film to which the load of 0 g, 68 g or 135 g was applied at the drying step was measured, in the same manner as in Experimental No. I-1 except that the drying temperature shown in Table III-(2) was employed. The results are shown in Table III-(2), respectively.
(With respect to retardation appeared by applying load to substrate film for liquid crystal)

The polymer film was dried in the same manner as in Experimental No. I-1 except that the drying temperature shown in Table III-(2) was employed, to give a substrate film for liquid crystal. Also, the retardation of the substrate film for liquid crystal was measured in the same manner as in Experimental No. I-1 by applying the load of 0 g, 250 g or 500 g to substrate film for liquid crystal. The results are shown in Table III-(2), respectively.

(c) Stretching of substrate film for liquid crystal

A phase differential substrate film for liquid crystal was prepared and the retardation thereof was measured in the same manner as in Experimental No. I-1 except that the stretching temperature and the stretching ratio shown in Table III-(3) were employed. The results are shown in Table III-(3).

(d), (e) Formation of barrier layer and transparent electrode for liquid crystal A barrier layer and a transparent electrode were formed on one side of the phase differential substrate film for liquid crystal to prepare a phase differential substrate of electrode for liquid crystal in the same manner as in Experimental No. I-1.

A surface electrical resistance and optical permeability of the above-mentioned phase differential substrate of electrode for liquid crystal, and a retardation, surface electrical resistance and optical permeability of the phase differential substrate of electrode for liquid crystal which was heat-treated in the same manner as in Experimental No. I-1 were measured in the same manner as in Experimental No. I-1. The results are shown in Table III-(3).

TABLE III-(2)

| | Retardation appeared by applying load at the time of drying the polymer film (nm) | | | | Retardation appeared by applying load to substrate film for liquid crystal (nm) | | | | |
|---|---|---|---|---|---|---|---|---|---|
| | Drying temperature (°C.) | | Load at the time of drying | | | Drying temperature (°C.) | | Load at the time of measuring | |
| Experimental No. | First step | Second step | 0 g | 68 g | 135 g | First step | Second step | 0 g | 250 g | 500 g |
| III-1 | 120 | 190 | 0 | 8 | 15 | 120 | 190 | 0 | 12 | 25 |
| III-2 | 120 | 190 | 0 | 8 | 16 | 120 | 190 | 0 | 12 | 24 |

TABLE III-(3)

| | | | | Characteristics of phase differential substrate of electrode for liquid crystal | | | | | |
|---|---|---|---|---|---|---|---|---|---|
| | | | | Before heating | | | After heating (180° C. × 1 hr) | | |
| Experimental No. | Stretching temperature (°C.) | Stretching ratio | Retardation (nm) | Surface resistivity (Ω/□) | Optical permeability (%) | Retardation (nm) | Surface resistivity (Ω/□) | Optical permeability (%) |
| III-1 | 275 | 1.4 | 510 | 72 | 80 | 505 | 70 | 82 |
| III-2 | 275 | 1.4 | 500 | 71 | 79 | 495 | 70 | 81 |

EXAMPLE IV

Experiments for the polymer blend of the particular aromatic polyester and the conventional aromatic polyester (where the blending ratio is varied).

EXPERIMENTAL NOS. IV-1 to IV-5

(Experimental No. IV-1 is the same as Experimental No. I-1)

(a) Preparation of polymer for substrate film for liquid crystal

As shown in Table IV-(1), the particular aromatic polyester having 1,1-bis(4-hydroxyphenyl)-3,3,5-trimethylcyclohexane as diol component and terephthalic acid and isophthalic acid (molar ratio=1:1) as dicarboxylic acid components was blended with the conventional aromatic polyester having bisphenol A as bisphenol component and terephthalic acid and isophthalic acid (molar ratio=1:1) as dicarboxylic acid components in the weight ratio shown in Table IV-(1). Tg of the polymer blend is shown in Table IV-(1).

TABLE IV-(1)

| Experimental No. | Aromatic polyester | | Characteristics of polymer blend Tg (°C.) |
|---|---|---|---|
| | Particular aromatic polyester*5 | Conventional aromatic polyester*6 | |
| IV-1 | 100% by weight | — | 275 |
| IV-2 | 92% by weight | 8% by weight | 268 |
| IV-3 | 79% by weight | 21% by weight | 257 |
| IV-4 | 74% by weight | 26% by weight | 250 |
| IV-5 | 55% by weight | 45% by weight | 237 |

*5Aromatic polyester of which bisphenol component being 1,1-bis(4-hydroxyphenyl)-3,3,5-trimethylcyclohexane and of which dicarboxylic acid components being terephthalic acid and isophthalic acid (molar ratio = 1:1), (weight-average molecular weight = 55,000, Tg = 275° C.)
*6Aromatic polyester of which bisphenol component being bisphenol A and of which dicarboxylic acid components being terephthalic acid and isophthalic acid (molar ratio = 1:1)

(b) Preparation of substrate film for liquid crystal

A methylene chloride solution of the polymer blend (concentration=15% by weight) was prepared, and a polymer film (containing residual methylene chloride) was prepared in the same manner as in Experimental No. I-1.

(With respect to retardation appeared by applying load at the time of drying the polymer film)

The polymer film was dried and the retardation of the polymer film to which the load of 0 g, 68 g or 135 g was applied at a drying step was measured, in the same manner as in Experimental No. I-1 except that the drying temperature shown in Table IV-(2) was employed. The results are shown in Table IV-(2), respectively.

(With respect to retardation appeared by applying load to substrate film for liquid crystal)

The polymer film was dried in the same manner as in Experimental No. I-1 except that the drying temperature shown in Table IV-(2) was employed, to give a substrate film for liquid crystal. Also, the retardation of the substrate film for liquid crystal was measured in the same manner as in Experimental No. I-1 by applying the load of 0 g, 250 g or 500 g to substrate film for liquid crystal. The results are shown in Table IV-(2), respectively.

TABLE IV-(2)

| | Retardation appeared by applying load at the time of drying the polymer film (nm) | | | | | Retardation appeared by applying load to substrate film for liquid crystal (nm) | | | | |
|---|---|---|---|---|---|---|---|---|---|---|
| | Drying temperature (°C.) | | Load at the time of drying | | | Drying temperature (°C.) | | Load at the time of measuring | | |
| Experimental No. | First step | Second step | 0 g | 68 g | 135 g | First step | Second step | 0 g | 250 g | 500 g |
| IV-1 | 120 | 170 | 0 | 7 | 15 | 120 | 170 | 0 | 11 | 24 |
| IV-2 | 120 | 170 | 0 | 8 | 15 | 120 | 170 | 0 | 12 | 25 |
| IV-3 | 120 | 170 | 0 | 10 | 17 | 120 | 170 | 0 | 14 | 27 |
| IV-4 | 120 | 170 | 0 | 13 | 26 | 120 | 170 | 0 | 15 | 28 |
| IV-5 | 120 | 170 | 0 | 15 | 28 | 120 | 170 | 0 | 21 | 40 |

(c) Stretching of substrate film for liquid crystal

A phase differential substrate film for liquid crystal was prepared and the retardation thereof was measured in the same manner as in Experimental No. I-1 except that the stretching temperature and the stretching ratio shown in Table IV-(3) were employed. The results are shown in Table IV-(3).

(d), (e) Formation of barrier layer and transparent electrode for liquid crystal A barrier layer and a transparent electrode were formed on one side of the phase differential substrate film for liquid crystal to prepare a phase differential substrate of electrode for liquid crystal in the same manner as in Experimental No. I-1.

A surface electrical resistance and optical permeability of the phase differential substrate of electrode for liquid crystal, and a retardation, surface electrical resistance and optical permeability of the phase differential substrate of electrode for liquid crystal which was heat-treated in the same manner as in Experimental No. I-1 were measured in the same manner as in Experimental No. I-1. The results are shown in Table IV-(3).

(b) Preparation of substrate film for liquid crystal

A methylene chloride solution of the polymer blend (concentration=15% by weight) was prepared, and a polymer film (containing residual methylene chloride) was prepared in the same manner as in Experimental No. I-1.
(With respect to retardation appeared by applying load at the time of drying the polymer film)

The polymer film was dried and the retardation of the polymer film to which the load of 0 g, 68 g or 135 g was applied at the drying step was measured, in the same manner as in Experimental No. I-1 except that the drying tempera-

TABLE IV-(3)

| | | | | Characteristics of phase differential substrate of electorde for liquid crystal | | | | |
|---|---|---|---|---|---|---|---|---|
| | | | | Before heating | | After heating (180° C. × 1 hr) | | |
| Experimental No. | Stretching temperature (°C.) | Stretching ratio | Retardation (nm) | Surface resistivity (Ω/□) | Optical permeability (%) | Retardation (nm) | Surface resistivity (Ω/□) | Optical permeability (%) |
| IV-1 | 275 | 1.4 | 500 | 70 | 80 | 495 | 68 | 81 |
| IV-2 | 270 | 1.4 | 500 | 70 | 80 | 495 | 69 | 80 |
| IV-3 | 260 | 1.4 | 490 | 72 | 79 | 485 | 70 | 81 |
| IV-4 | 255 | 1.4 | 490 | 70 | 80 | 490 | 69 | 82 |
| IV-5 | 245 | 1.4 | 500 | 70 | 80 | 495 | 70 | 80 |

EXAMPLE V

Experiments for the polymer blend of the particular aromatic polyester and the conventional polycarbonate

EXPERIMENTAL NO. V-1

(a) Preparation of polymer for substrate film for liquid crystal

The particular aromatic polyester and the conventional aromatic polyester shown in Table V-(1), were blended in the weight ratio shown in Table V-(1). Tg of the above-mentioned polymer blend is shown in Table V-(1).

ture shown in Table V-(2) was employed. The results are shown in Table V-(2), respectively.
(With respect to retardation appeared by applying load to substrate film for liquid crystal)

The polymer film was dried in the same manner as in Experimental No. I-1 except that the drying temperature shown in Table V-(2) was employed, to give a substrate film for liquid crystal. Also, the retardation of the substrate film for liquid crystal was measured in the same manner as in Experimental No. I-1 by applying the load of 0 g, 250 g or 500 g to substrate film for liquid crystal. The results are shown in Table V-(2), respectively.

TABLE V-(2)

| | Retardation appeared by applying load at the time of drying the polymer film (nm) | | | | | Retardation appeared by applying load to substrate film for liquid crystal (nm) | | | | |
|---|---|---|---|---|---|---|---|---|---|---|
| | Drying temperature (°C.) | | Load at the time of drying | | | Drying temperature (°C.) | | Load at the time of measuring | | |
| Experimental No. | First step | Second step | 0 g | 68 g | 135 g | First step | Second step | 0 g | 250 g | 500 g |
| V-1 | 120 | 170 | 0 | 9 | 16 | 120 | 180 | 0 | 13 | 27 |

TABLE V-(1)

| | Polymer blend | | Characteristics of |
|---|---|---|---|
| Experimental No. | Particular aromatic polyester*[7] | Conventional polycarbonate*[8] | polymer blend Tg (°C.) |
| V-1 | 50% by weight | 50% by weight | 208 |

*[7]Aromatic polyester of which bisphenol component being 1,1-bis(4-hydroxyphenyl)-3,3,5-trimethylcyclohexane and of which dicarboxylic acid components being terephthalic acid and isophthalic acid (molar ratio = 1:1)
*[8]Polycarbonate of which bisphenol component was bisphenol A (weight-average molecular weight = 80,000, Tg = 150° C.)

(c) Stretching of substrate film for liquid crystal

A phase differential substrate film for liquid crystal was prepared and the retardation thereof was measured in the same manner as in Experimental No. I-1 except that the stretching temperature and the stretching ratio shown in Table V-(3) were employed. The results are shown in Table V-(3).

(d), (e) Formation of barrier layer and transparent electrode for liquid crystal A barrier layer and a transparent electrode were formed on one side of the phase differential substrate film for liquid crystal to prepare a phase differential substrate of electrode for liquid crystal in the same manner as in Experimental No. I-1.

A surface electrical resistance and optical permeability of the phase differential substrate of electrode for liquid crystal, and a retardation, surface electrical resistance and optical permeability of the phase differential substrate of electrode for liquid crystal which was heat-treated in the same manner as in Experimental No. I-1 were measured in the same manner as in Experimental No. I-1. The results are shown in Table V-(3).

(With respect to retardation appeared by applying load at the time of drying the polymer film)

The polymer film was dried and the retardation of the polymer film to which the load of 0 g, 68 g or 135 g was applied at the drying step was measured, in the same manner as in Experimental No. I-1 except that the drying tempera-

TABLE V-(3)

| | | | | Characteristics of phase differential substrate of electorde for liquid crystal | | | | |
|---|---|---|---|---|---|---|---|---|
| | | | | Before heating | | After heating (180° C. × 1 hr) | | |
| Experimental No. | Stretching temperature (°C.) | Stretching ratio | Retardation (nm) | Surface resistivity (Ω/□) | Optical permeability (%) | Retardation (nm) | Surface resistivity (Ω/□) | Optical permeability (%) |
| V-1 | 215 | 1.4 | 510 | 72 | 79 | 505 | 70 | 80 |

EXAMPLE VI

Experiments where the molecular weight of the aromatic polyester is varied

EXPERIMENTAL NOS. VI-1 to VI-4

(a) Preparation of polymer for substrate film for liquid crystal

As shown in Table VI-(1), the particular aromatic polyester having 1,1-bis(4-hydroxyphenyl)-3,3,5-trimethylcyclohexane as diol component and terephthalic acid and isophthalic acid (molar ratio=1:1) as dicarboxylic acid components and a weight-average molecular weight shown in Table VI-(1) was prepared, and then Tg thereof was measured. The results are shown in Table VI-(1).

ture shown in Table VI-(2) was employed. The results are shown in Table VI-(2), respectively.

(With respect to retardation appeared by applying load to substrate film for liquid crystal)

The polymer film was dried in the same manner as in Experimental No. I-1 except that the drying temperature shown in Table VI-(2) was employed, to give a substrate film for liquid crystal. Also, the retardation of the substrate film for liquid crystal was measured in the same manner as in Experimental No. I-1 by applying the load of 0 g, 250 g or 500 g to substrate film for liquid crystal. The results are shown in Table VI-(2), respectively.

TABLE VI-(2)

| | Retardation appeared by applying load at the time of drying the polymer film (nm) | | | | | Retardation appeared by applying load to substrate film for liquid crystal (nm) | | | | |
|---|---|---|---|---|---|---|---|---|---|---|
| | Drying temperature (°C.) | | Load at the time of drying | | | Drying temperature (°C.) | | Load at the time of measuring | | |
| Experimental No. | First step | Second step | 0 g | 68 g | 135 g | First step | Second step | 0 g | 250 g | 500 g |
| VI-1 | 120 | 170 | 0 | 7 | 15 | 120 | 170 | 0 | 11 | 24 |
| VI-2 | 120 | 170 | 0 | 8 | 15 | 120 | 170 | 0 | 12 | 25 |
| VI-3 | 120 | 170 | 0 | 10 | 17 | 120 | 170 | 0 | 14 | 27 |
| VI-4 | 120 | 170 | 0 | 13 | 26 | 120 | 170 | 0 | 15 | 28 |
| VI-5 | 120 | 170 | 0 | 15 | 28 | 120 | 170 | 0 | 21 | 40 |

TABLE VI-(1)

| Experimental No. | Weight-average molecular weight of aromatic polyester*[9] | Characteristics of polymer Tg (°C.) |
|---|---|---|
| VI-1 | 90,000 | 280 |
| VI-2 | 70,000 | 280 |
| VI-3 | 55,000 | 275 |
| VI-4 | 30,000 | 270 |

*[9]Aromatic polyester having 1,1-bis(4-hydroxyphenyl)-3,3,5-trimethylcyclohexane as bisphenol component and terephthalic acid and isophthalic acid (molar ratio = 1:1) as dicarboxylic acid components (b) Preparation of substrate film for liquid crystal A methylene chloride solution of the polymer blend (concentration=15% by weight) was prepared, and a polymer film (containing residual methylene chloride) was prepared in the same manner as in Experimental No. I-1.

(c) Stretching of substrate film for liquid crystal

A phase differential substrate film for liquid crystal was prepared and the retardation thereof was measured in the same manner as in Experimental No. I-1 except that the stretching temperature and the stretching ratio shown in Table VI-(3) were employed. The results are shown in Table VI-(3).

(d), (e) Formation of barrier layer and transparent electrode for liquid crystal A barrier layer and a transparent electrode were formed on one side of the phase differential substrate film for liquid crystal to prepare a phase differential substrate of electrode for liquid crystal in the same manner as in Experimental Example I-1.

A surface electrical resistance and optical permeability of the above-mentioned phase differential substrate of electrode for liquid crystal, and a retardation, surface electrical resistance and optical permeability of the phase differential substrate of electrode for liquid crystal which was heat-treated in the same manner as in Experimental No. I-1 were measured in the same manner as in Experimental No. I-1. The results are shown in Table VI-(3).

TABLE VI-(3)

| | | | | Characteristics of phase differential substrate of electorde for liquid crystal | | | | |
|---|---|---|---|---|---|---|---|---|
| | | | | Before heating | | After heating (180° C. × 1 hr) | | |
| Experimental No. | Stretching temperature (°C.) | Stretching ratio | Retardation (nm) | Surface resistivity (Ω/□) | Optical permeability (%) | Retardation (nm) | Surface resistivity (Ω/□) | Optical permeability (%) |
| VI-1 | 280 | 1.4 | 510 | 70 | 80 | 510 | 70 | 81 |
| VI-2 | 280 | 1.4 | 520 | 72 | 81 | 515 | 71 | 81 |
| VI-3 | 275 | 1.4 | 500 | 70 | 79 | 495 | 69 | 80 |
| VI-4*[10] | — | — | — | — | — | — | — | — |

*[10]The measurement could not be carried out since the film was cracked in preparing thereof.

In Experimental Example VI-4, the weight-average molecular weight was so low that the film was cracked in preparing thereof.

<Examples relating to the aromatic polyester>

EXAMPLE VII

Experiments where the bisphenol component is varied

EXPERIMENTAL EXAMPLES VII-1 to VII-4

(a) Preparation of polymer for substrate film for liquid crystal

The weight (0.3 mole) shown in Table VII-(1) of the bisphenol shown in Table VII-(1), 1.35 g (0.009 mole) of para-t-butylphenol and 500 ml of aqueous sodium hydroxide solution (5N) were added into a 2 l three necked flask under nitrogen atmosphere and dissolved. Further, 500 ml of methylene chloride was added into the flask, and 59.4 g (0.6 mole) of phosgen was introduced into the flask under room temperature with vigorous stirring, subsequently 0.34 g (0.003 mole) of N-ethylpiperidine was added, and then the stirring was continued for 80 minutes. After the stirring, the aqueous phase was decanted, and the same amount of pure water as that of the decanted aqueous phase was added, and a small amount of hydrochloride was added with stirring to neutralize. Further, the above-mentioned processes of decantation, addition of pure water and stirring were repeated five times, and after the aqueous phase was decanted finally, 300 ml of methylene chloride was added and this solution was heated to 40° to 50° C. to remove water together with methylene chloride from the obtained methylene chloride solution of the polymer by azeotropic dehydration. Further, the heating was continued until the concentration became 15% by weight. And, the polymer solution was casted on a glass plate. After allowing to stand for 60 minutes at room temperature, a polymer film was peeled off from the glass plate, and dried for 2 hours at 150° C. with a drier to obtain a film of the polycarbonate polymer. A weight-average molecular weight and Tg of the polymer are shown in Table VI-(1).

TABLE VII-(1)

| | Bisphenol component | | Characteristics of polymer | |
|---|---|---|---|---|
| Experimental No. | Kind of Bisphenol | Weight (g) | Weight-average molecular weight | Tg (°C.) |
| VII-1 | Bisphenol (I)*[1] | 93.1 | 85,000 | 235 |
| VII-2 | Bisphenol (II)*[2] | 101.5 | 82,000 | 240 |
| VII-3 | Bisphenol (III)*[3] | 109.9 | 86,000 | 240 |
| VII-4 | Bisphenol A | 68.5 | 80,000 | 150 |

*[1]1,1-bis(4-hydroxyphenyl)-3,3,5-trimethylcyclohexane
*[2]1,1-bis(3-methyl-4-hydroxyphenyl)-3,3,5-trimethylcyclohexane
*[3]1,1-bis(3,5-dimethyl-4-hydroxyphenyl)-3,3,5-trimethylcyclohexane (b) Preparation of substrate film for liquid crystal A methylene chloride solution of the polymer (concentration=15% by weight) was prepared, and a polymer film (containing residual methylene chloride) was prepared in the same manner as in Experimental No. I-1.

(With respect to retardation appeared by applying load at the time of drying the polymer film)

The polymer film was dried and the retardation of the polymer film to which the load of 0 g, 68 g or 135 g was applied at the drying step was measured, in the same manner as in Experimental No. I-1 except that the drying temperature shown in Table VII-(2) was employed. The results are shown in Table VII-(2), respectively.

(With respect to retardation appeared by applying load to substrate film for liquid crystal)

The polymer film was dried in the same manner as in Experimental No. I-1 except that the drying temperature shown in Table VII-(2) was employed, to give a substrate film for liquid crystal. Also, the retardation of the substrate film for liquid crystal was measured in the same manner as in Experimental No. I-1 by applying the load of 0 g, 250 g or 500 g to substrate film for liquid crystal. The results are shown in Table VII-(2), respectively.

TABLE VII-(2)

| | Retardation appeared by applying load at the time of drying the polymer film (nm) | | | | | Retardation appeared by applying load to substrate film for liquid crystal (nm) | | | | |
|---|---|---|---|---|---|---|---|---|---|---|
| | Drying temperature (°C.) | | Load at the time of drying | | | Drying temperature (°C.) | | Load at the time of measuring | | |
| Experimental No. | First step | Second step | 0 g | 68 g | 135 g | First step | Second step | 0 g | 250 g | 500 g |
| VII-1 | 120 | 170 | 0 | 4 | 8 | 120 | 170 | 0 | 9 | 19 |
| VII-2 | 120 | 170 | 0 | 5 | 9 | 120 | 170 | 0 | 8 | 17 |
| VII-3 | 120 | 170 | 0 | 3 | 7 | 120 | 170 | 0 | 9 | 18 |
| VII-4 | 120 | 140 | 0 | 20 | 38 | 120 | 170 | 0 | 15 | 29 |

(c) Stretching of substrate film for liquid crystal

A phase differential substrate film for liquid crystal was prepared and the retardation thereof was measured in the same manner as in Experimental No. I-1 except that the stretching temperature and the stretching ratio shown in Table VII-(3) were employed. The results are shown in Table VII-(3).

(d), (e) Formation of barrier layer and transparent electrode for liquid crystal A barrier layer and a transparent electrode were formed on one side of the phase differential substrate film for liquid crystal to prepare a phase differential substrate of electrode for liquid crystal in the same manner as in Experimental No. I-1.

A surface electrical resistance and an optical permeability of the phase differential substrate of electrode for liquid crystal, and a retardation, surface electrical resistance and optical permeability of the phase differential substrate of electrode for liquid crystal which was heat-treated in the same manner as in Experimental No. I-1 were measured in the same manner as in Experimental No. I-1. The results are shown in Table VII-(3).

EXAMPLE VIII

Experiments where the polycarbonate has both particular bisphenol and conventional bisphenol as bisphenol components

EXPERIMENTAL NOS. VIII-1 to VIII-4

(a) Preparation of polymer for substrate film for liquid crystal

A aromatic polycarbonate polymer film was prepared in the same manner as in Experimental No. VII-1 except that the particular bisphenol i.e. 1,1-bis(4-hydroxyphenol)-3,3,5-trimethylcyclohexane and the conventional bisphenol, i. e. bisphenol A, the amounts of which are shown in Table VIII-(1), were used as bisphenol components, and 1.80 g

TABLE VII-(3)

| | | | | Characteristics of phase differential substrate of electrode for liquid crystal | | | | | |
|---|---|---|---|---|---|---|---|---|---|
| | | | | Before heating | | | After heating (180° C. × 1 hr) | | |
| Experimental No. | Stretching temperature (°C.) | Stretching ratio | Retardation (nm) | Surface resistivity (Ω/□) | Optical permeability (%) | | Retardation (nm) | Surface resistivity (Ω/□) | Optical permeability (%) |
| VII-1 | 240 | 1.4 | 490 | 70 | 79 | | 485 | 70 | 81 |
| VII-2 | 245 | 1.4 | 480 | 70 | 80 | | 475 | 68 | 82 |
| VII-3 | 245 | 1.4 | 490 | 72 | 81 | | 480 | 70 | 82 |
| VII-4 | 155 | 1.2 | 480 | 72 | 81 | | —[*11] | —[*11] | —[*11] |

[*11] Measurement could not be carried out since thermo-plastic deformation happened In case that the phase differential substrate of electrode for liquid crystal in Experimental No. VII-4 was heated under 180° C.×1 hr, the film was thermally deformed.

(0.012 mole) of para-t-butylphenol was used. A weight-average molecular weight and Tg of the polymer are shown in Table VIII-(1).

TABLE VIII-(1)

| Experimental Ex. No. | Bisphenol component[*12] | | Characteristics of polymer | |
|---|---|---|---|---|
| | Bisphenol (I)[*1] (g) | Bisphenol A (g) | Weight-average molecular weight | Tg (°C.) |
| VIII-1 | 93.1 (100% by mole) | — | 62,000 | 230 |
| VIII-2 | 65.2 | 20.6 | 58,000 | 205 |

TABLE VIII-(1)-continued

| Experimental | Bisphenol component*12 | | Characteristics of polymer | |
|---|---|---|---|---|
| Ex. No. | Bisphenol (I)*1 (g) | Bisphenol A (g) | Weight-average molecular weight | Tg (°C.) |
| VIII-3 | (70% by mole) 46.6 | (30% by mole) 34.2 | 59,000 | 190 |
| VIII-4 | (50% by mole) 37.3 (40% by mole) | (50% by mole) 41.1 (60% by mole) | 61,000 | 182 |

*1 1,1-bis(4-hydroxyphenyl)-3,3,5-trimethylcyclohexane
*12 The values shown in the parentheses are % by mole of each bisphenol in the whole bisphenol components.

(b) Preparation of substrate film for liquid crystal

A methylene chloride solution of the polymer (concentration=15% by weight) was prepared, and a polymer film (containing residual methylene chloride) was prepared in the same manner as in Experimental No. I-1.
(With respect to retardation appeared by applying load at the time of drying the polymer film)

The polymer film was dried and the retardation of the polymer film to which the load of 0 g, 68 g or 135 g was applied at the drying step was measured, in the same manner as in Experimental No. I-1 except that the drying temperature shown in Table VIII-(2) was employed. The results are shown in Table VIII-(2), respectively.
(With respect to retardation appeared by applying load to substrate film for liquid crystal)

The polymer film was dried in the same manner as in Experimental No. I-1 except that the drying temperature shown in Table VIII-(2) was employed, to give a substrate film for liquid crystal. Also, the retardation of the substrate film for liquid crystal was measured in the same manner as in Experimental No. I-1 by applying the load of 0 g, 250 g or 500 g to substrate film for liquid crystal. The results are shown in Table VIII-(2), respectively.

(c) Stretching of substrate film for liquid crystal

A phase differential substrate film for liquid crystal was prepared and the retardation thereof was measured in the same manner as in Experimental No. I-1 except that the stretching temperature and the stretching ratio shown in Table VIII-(3) were employed. The results are shown in Table VIII-(3).

(d), (e) Formation of barrier layer and transparent electrode for liquid crystal A barrier layer and a transparent electrode were formed on one side of the phase differential substrate film for liquid crystal to prepare a phase differential substrate of electrode for liquid crystal in the same manner as in Experimental No. I-1.

A surface electrical resistance and optical permeability of the phase differential substrate of electrode for liquid crystal, and a retardation, surface electrical resistance and optical permeability of the phase differential substrate of electrode for liquid crystal which was heat-treated in the same manner as in Experimental No. I-1 were measured in the same manner as in Experimental No. I-1. The results are shown in Table VIII-(3).

TABLE VIII-(2)

| | Retardation appeared by applying load at the time of drying the polymer film (nm) | | | | | Retardation appeared by applying load to substrate film for liquid crystal (nm) | | | | |
|---|---|---|---|---|---|---|---|---|---|---|
| | Drying temperature (°C.) | | Load at the time of drying | | | Drying temperature (°C.) | | Load at the time of measuring | | |
| Experimental No. | First step | Second step | 0 g | 68 g | 135 g | First step | Second step | 0 g | 250 g | 500 g |
| VIII-1 | 120 | 170 | 0 | 5 | 9 | 120 | 170 | 0 | 8 | 17 |
| VIII-2 | 120 | 170 | 0 | 5 | 10 | 120 | 170 | 0 | 10 | 20 |
| VIII-3 | 120 | 170 | 0 | 9 | 17 | 120 | 170 | 0 | 12 | 23 |
| VIII-4 | 120 | 170 | 0 | 10 | 18 | 120 | 170 | 0 | 13 | 25 |

TABLE VIII-(3)

| | | | | Characteristics of phase differential substrate of electrode for liquid crystal | | | | | |
|---|---|---|---|---|---|---|---|---|---|
| | | | | Before heating | | | After heating (180° C. × 1 hr) | | |
| Experimental No. | Stretching temperature (°C.) | Stretching ratio | Retardation (nm) | Surface resistivity (Ω/□) | Optical permeability (%) | Retardation (nm) | Surface resistivity (Ω/□) | Optical permeability (%) | |
| VIII-1 | 240 | 1.4 | 510 | 70 | 80 | 505 | 69 | 81 | |
| VIII-2 | 216 | 1.4 | 490 | 70 | 82 | 485 | 68 | 82 | |

TABLE VIII-(3)-continued

|  |  |  |  | Characteristics of phase differential substrate of electrode for liquid crystal | | | | |
| --- | --- | --- | --- | --- | --- | --- | --- | --- |
|  |  |  |  | Before heating | | After heating (180° C. × 1 hr) | | |
| Experimental No. | Stretching temperature (°C.) | Stretching ratio | Retardation (nm) | Surface resistivity (Ω/□) | Optical permeability (%) | Retardation (nm) | Surface resistivity (Ω/□) | Optical permeability (%) |
| VIII-3 | 195 | 1.4 | 480 | 70 | 80 | 476 | 70 | 81 |
| VIII-4 | 190 | 1.4 | 500 | 72 | 81 | 320 | —[*13] | 81 |

[*13]Measurement could not be carried out since the film was cracked due to shrinkage.

In case that the phase differential substrate of electrode for liquid crystal in Experimental No. VIII-4 was heated under 180° C.×1 hr, crack was observed in the film.

EXAMPLE IX

Experiments where the polycarbonate has two different kinds of the particular bisphenol as bisphenol components.

EXPERIMENTAL NOS. IX-1 and IX-2

A polycarbonate polymer was prepared in the same manner as in Experimental No. VII-1 except that two of the particular bisphenols shown in Table IX-(1), the amounts of which are shown in Table IX-(1), were used, and 1.80 g (0.012 mole) of para-t-butylphenol was used. A weight-average molecular weight and Tg are shown in Table IX-(1).

(With respect to retardation appeared by applying load at the time of drying the polymer film)

The polymer film was dried and the retardation of the polymer film to which the load of 0 g, 68 g or 135 g was applied at the drying step was measured, in the same manner as in Experimental No. I-1 except that the drying temperature shown in Table IX-(2) was employed. The results are shown in Table IX-(2), respectively.

(With respect to retardation appeared by applying load to substrate film for liquid crystal)

The polymer film was dried in the same manner as in Experimental No. I-1 except that the drying temperature shown in Table IX-(2) was employed, to give a substrate film

TABLE IX-(1)

| | Bisphenol component[*14] | | | Characteristics of polymer | |
| --- | --- | --- | --- | --- | --- |
| Experimental No. | Bisphenol (I)[*1] (g) | Bisphenol (II)[*2] (g) | Bisphenol (III)[*3] (g) | Weight-average molecular weight | Tg (°C.) |
| IX-1 | 46.6 (50% by mole) | 50.8 (50% by mole) | — | 61,000 | 235 |
| IX-2 | 46.6 (50% by mole) | — | 55.0 (50% by mole) | 59,000 | 240 |

[*1]1,1-bis(4-hydroxyphenyl)-3,3,5-trimethylcyclohexane
[*2]1,1-bis(3-methyl-4-hydroxyphenyl)-3,3,5-trimethylcyclohexane
[*3]1,1-bis(3,5-dimethyl-4-hydroxyphenyl)-3,3,5-trimethylcyclohexane
[*14]The values shown in the parentheses are % by mole of each bisphenol in the whole bisphenol components.

(b) Preparation of substrate film for liquid crystal

A methylene chloride solution of the polymer (concentration=15% by weight) was prepared, and a polymer film (containing residual methylene chloride) was prepared in the same manner as in Experimental No. I-1.

for liquid crystal. Also, the retardation of the substrate film for liquid crystal was measured in the same manner as in Experimental No. I-1 by applying the load of 0 g, 250 g or 500 g to substrate film for liquid crystal. The results are shown in Table IX-(2), respectively.

TABLE IX-(2)

| | Retardation appeared by applying load at the time of drying the polymer film (nm) | | | | | Retardation appeared by applying load to substrate film for liquid crystal (nm) | | | | |
| --- | --- | --- | --- | --- | --- | --- | --- | --- | --- | --- |
| | Drying temperature (°C.) | | Load at the time of drying | | | Drying temperature (°C.) | | Load at the time of measuring | | |
| Experimental No. | First step | Second step | 0 g | 68 g | 135 g | First step | Second step | 0 g | 250 g | 500 g |
| IX-1 | 120 | 170 | 0 | 5 | 9 | 120 | 170 | 0 | 11 | 23 |
| IX-2 | 120 | 170 | 0 | 5 | 10 | 120 | 170 | 0 | 12 | 22 |

(c) Stretching of substrate film for liquid crystal

A phase differential substrate film for liquid crystal was prepared and the retardation thereof was measured in the same manner as in Experimental No. I-1 except that the stretching temperature and the stretching ratio shown in Table IX-(3) were employed. The results are shown in Table IX-(3).

(d), (e) Formation of barrier layer and transparent electrode for liquid crystal A barrier layer and a transparent electrode were formed on one side of the phase differential substrate film for liquid crystal to prepare a phase differential substrate of electrode for liquid crystal in the same manner as in Experimental No. I-1.

The surface electrical resistance and optical permeability of the phase differential substrate of electrode for liquid crystal, and a retardation, surface electrical resistance and optical permeability of the phase differential substrate of electrode for liquid crystal which was heat-treated in the same manner as in Experimental No. I-1 were measured in the same manner as in Experimental No. I-1. The results are shown in Table IX-(3).

TABLE IX-(3)

| | | | Characteristics of phase differential substrate of electrode for liquid crystal | | | | | |
|---|---|---|---|---|---|---|---|---|
| | | | | Before heating | | After heating (180° C. × 1 hr) | | |
| Experimental No. | Stretching temperature (°C.) | Stretching ratio | Retardation (nm) | Surface resistivity (Ω/□) | Optical permeability (%) | Retardation (nm) | Surface resistivity (Ω/□) | Optical permeability (%) |
| IX-1 | 240 | 1.4 | 480 | 70 | 80 | 475 | 68 | 81 |
| IX-2 | 245 | 1.4 | 490 | 68 | 81 | 485 | 67 | 81 |

EXAMPLE X

Experiments for the polymer blend of the particular polycarbonate (having two of bisphenol as bisphenol components) and the conventional polycarbonate.

EXPERIMENTAL NOS. X-1 TO X-5

(a) Preparation of polymer for substrate film for liquid crystal

As shown in Table X-(1), the aromatic polycarbonate having 1,1-bis(4-hydroxyphenyl)-3,3,5-trimethylcyclohexane and bisphenol A as diol components, was blended with the aromatic polycarbonate having bisphenol A as diol component, in the weight ratio shown in Table X-(1). Tg of the above-mentioned polymer blend is shown in Table X-(1).

X-(1)

| | Polycarbonate | | Characteristics of |
|---|---|---|---|
| Experimenatl No. | Particular polycarbonate*15 | Conventional polycarbonate*16 | polymer blend Tg (°C.) |
| X-1 | 100% by weight | — | 205 |
| X-2 | 80% by weight | 20% by weight | 195 |
| X-3 | 60% by weight | 40% by weight | 184 |

X-(1)-continued

| | Polycarbonate | | Characteristics of |
|---|---|---|---|
| Experimenatl No. | Particular polycarbonate*15 | Conventional polycarbonate*16 | polymer blend Tg (°C.) |
| X-4 | 50% by weight | 50% by weight | 178 |
| X-5 | 30% by weight | 70% by weight | 163 |

*15Polycarbonate in which bisphenol components comprise 70% by mole of 1,1-bis(4-hydroxyphenyl)-3,3,5-trimethylcyclohexane and 30% by mole of bisphenol A (weight-average molecular weight = 58,000, Tg = 205° C.)
*16Polycarbonate in which bisphenol component is bisphenol A (weight-average molecular weight = 80,000, Tg = 150° C.)

(b) Preparation of substrate film for liquid crystal

A methylene chloride solution of the polymer blend (concentration=15% by weight) was prepared, and a polymer film (containing residual methylene chloride) was prepared in the same manner as in Experimental No. I-1.

(With respect to retardation appeared by applying load at the time of drying the polymer film)

The polymer film was dried and the retardation of the polymer film to which the load of 0 g, 68 g or 135 g was applied at the drying step was measured, in the same manner as in Experimental No. I-1 except that the drying temperature shown in Table X-(2) was employed. The results are shown in Table X-(2), respectively.

(With respect to retardation appeared by applying load to substrate film for liquid crystal)

The polymer film was dried in the same manner as in Experimental No. I-1 except that the drying temperature shown in Table X-(2) was employed, to give a substrate film for liquid crystal. Also, the retardation of the substrate film for liquid crystal was measured in the same manner as in Experimental No. I-1 by applying the load of 0 g, 250 g or 500 g to substrate film for liquid crystal. The results are shown in Table X-(2), respectively.

TABLE X-(2)

| | Retardation appeared by applying load at the time of drying the polymer film (nm) | | | | | Retardation appeared by applying load to substrate film for liquid crystal (nm) | | | | |
|---|---|---|---|---|---|---|---|---|---|---|
| | Drying temperature (°C.) | | Load at the time of drying | | | Drying temperature (°C.) | | Load at the time of measuring | | |
| Experimental No. | First step | Second step | 0 g | 68 g | 135 g | First step | Second step | 0 g | 250 g | 500 g |
| X-1 | 120 | 170 | 0 | 5 | 10 | 120 | 170 | 0 | 10 | 20 |
| X-2 | 120 | 170 | 0 | 7 | 14 | 120 | 170 | 0 | 12 | 22 |
| X-3 | 120 | 170 | 0 | 9 | 18 | 120 | 170 | 0 | 13 | 24 |
| X-4 | 120 | 170 | 0 | 18 | 31 | 120 | 170 | 0 | 14 | 27 |
| X-5 | 120 | 170 | 0 | —[17] | —[17] | 120 | 170 | 0 | 17 | 35 |

[17] Deformation of the film was so large that measurement could not be carried out.

(c) Stretching of substrate film for liquid crystal

A phase differential substrate film for liquid crystal was prepared and the retardation thereof was measured in the same manner as in Experimental No. I-1 except that the stretching temperature and the stretching ratio shown in Table X-(3) were employed. The results are shown in Table X-(3).

(d), (e) Formation of barrier layer and transparent electrode for liquid crystal A barrier layer and a transparent electrode were formed on one side of the phase differential substrate film for liquid crystal to prepare a phase differential substrate of electrode for liquid crystal in the same manner as in Experimental No. I-1.

A surface electrical resistance and optical permeability of the phase differential substrate of electrode for liquid crystal, and a retardation, surface electrical resistance and optical permeability of the phase differential substrate of electrode for liquid crystal which was heat-treated in the same manner as in Experimental No. I-1 were measured in the same manner as in Experimental No. I-1. The results are shown in Table X-(3).

EXPERIMENTAL NOS. XI-1 to XI-5

(a) Preparation of polymer for substrate film for liquid crystal

As shown in Table XI-(1), the polycarbonate having 1,1-bis(4-hydroxyphenyl)-3,3,5-trimethylcyclohexane and bisphenol A as diol components, was blended with the polycarbonate having bisphenol A as diol component, in the weight ratio shown in Table XI-(1). Tg of the polymer blend is shown in Table XI-(1).

XI-(1)

| | Polycarbonate | | Characteristics of |
|---|---|---|---|
| Experimenatl No. | Particular polycarbonate[19] | Conventional polycarbonate[20] | polymer blend Tg (°C.) |
| XI-1 | 100% by weight | — | 235 |
| XI-2 | 80% by weight | 20% by weight | 220 |
| XI-3 | 60% by weight | 40% by weight | 205 |

TABLE X-(3)

| | | | | Characteristics of phase differential substrate of electrode for liquid crystal | | | | |
|---|---|---|---|---|---|---|---|---|
| | | | | Before heating | | After heating (180° C. × 1 hr) | | |
| Experimental No. | Stretching temperature (°C.) | Stretching ratio | Retardation (nm) | Surface resistivity (Ω/□) | Optical permeability (%) | Retardation (nm) | Surface resistivity (Ω/□) | Optical permeability (%) |
| X-1 | 216 | 1.4 | 490 | 70 | 82 | 485 | 68 | 82 |
| X-2 | 200 | 1.4 | 500 | 72 | 80 | 490 | 70 | 81 |
| X-3 | 195 | 1.4 | 500 | 70 | 80 | 493 | 68 | 81 |
| X-4 | 180 | 1.4 | 490 | 72 | 81 | 485 | 70 | 80 |
| X-5 | 170 | 1.4 | 500 | 70 | 80 | —[18] | —[18] | —[18] |

[18] Measurement could not be carried out since the film was cracked due to shrinkage.

In the film of Experimental No. IX-5, in case of under the drying condition described in Table IX-(2), deformation of the film was observed, and in case of under the heating condition of phase differential substrate of electrode for liquid crystal shown in Table IX-(3), the film was deformed due to shrinkage.

EXAMPLE XI

Experiments for the polymer blend of the particular polycarbonate (diol component thereof being one of bisphenol) and the conventional polycarbonate (where the blending ratio being varied).

XI-(1)-continued

| Experimenatl No. | Polycarbonate Particular polycarbonate*[19] | Conventional polycarbonate*[20] | Characteristics of polymer blend Tg (°C.) |
|---|---|---|---|
| XI-4 | 50% by weight | 50% by weight | 190 |
| XI-5 | 40% by weight | 60% by weight | 185 |

*[19]Polycarbonate in which bisphenol component is 1,1-bis(4-hydroxyphenyl)-3,3,5-trimethylcyclohexane (weight-average molecular weight = 85,000, Tg = 235° C.)
*[20]Polycarbonate in which bisphenol component is bisphenol A (weight-average molecular weight = 80,000, Tg = 150° C.)

(b) Preparation of substrate film for liquid crystal

A methylene chloride solution of the polymer blend (concentration=15% by weight) was prepared, and a polymer film (containing residual methylene chloride) was prepared in the same manner as in Experimental No. I-1.
(With respect to retardation appeared by applying load at the time of drying the polymer film)

The above-mentioned polymer film was dried and the retardation of the polymer film to which the load of 0 g, 68 g or 135 g was applied at the drying step was measured, in the same manner as in Experimental No. I-1 except that the drying temperature shown in Table XI-(2) was employed. The results are shown in Table XI-(2), respectively.
(With respect to retardation appeared by applying load to substrate film for liquid crystal)

The polymer film was dried in the same manner as in Experimental No. I-1 except that the drying temperature shown in Table XI-(2) was employed, to give a substrate film for liquid crystal. Also, the retardation of the substrate film for liquid crystal was measured in the same manner as in Experimental No. I-1 with applying the load of 0 g, 250 g or 500 g to substrate film for liquid crystal. The results are shown in Table XI-(2), respectively.

(c) Stretching of substrate film for liquid crystal

A phase differential substrate film for liquid crystal was prepared and the retardation thereof was measured in the same manner as in Experimental No. I-1 except that the stretching temperature and the stretching ratio shown in Table XI-(3) were employed. The results are shown in Table XI-(3).

(d), (e) Formation of barrier layer and transparent electrode for liquid crystal A barrier layer and a transparent electrode were formed on one side of the phase differential substrate film for liquid crystal to prepare a phase differential substrate of electrode for liquid crystal in the same manner as in Experimental No. I-1.

A surface electrical resistance and optical permeability of the phase differential substrate of electrode for liquid crystal, and a retardation, surface electrical resistance and optical permeability of the phase differential substrate of electrode for liquid crystal which was heat-treated in the same manner as in Experimental No. I-1 were measured in the same manner as in Experimental No. I-1. The results are shown in Table XI-(3).

TABLE XI-(2)

| | Retardation appeared by applying load at the time of drying the polymer film (nm) | | | | Retardation appeared by applying load to substrate film for liquid crystal (nm) | | | | |
|---|---|---|---|---|---|---|---|---|---|
| | Drying temperature (°C.) | | Load at the time of drying | | Drying temperature (°C.) | | Load at the time of measuring | | |
| Experimental No. | First step | Second step | 0 g | 68 g | 135 g | First step | Second step | 0 g | 250 g | 500 g |
| XI-1 | 120 | 170 | 0 | 4 | 8 | 120 | 170 | 0 | 9 | 19 |
| XI-2 | 120 | 170 | 0 | 6 | 11 | 120 | 170 | 0 | 9 | 18 |
| XI-3 | 120 | 170 | 0 | 8 | 15 | 120 | 170 | 0 | 10 | 20 |
| XI-4 | 120 | 170 | 0 | 10 | 19 | 120 | 170 | 0 | 11 | 21 |
| XI-5 | 120 | 170 | 0 | 12 | 23 | 120 | 170 | 0 | 12 | 24 |

TABLE XI-(3)

| | | | | Characteristics of phase differential substrate of electrode for liquid crystal | | | | |
|---|---|---|---|---|---|---|---|---|
| | | | | Before heating | | After heating (180° C. × 1 hr) | | |
| Experimental No. | Stretching temperature (°C.) | Stretching ratio | Retardation (nm) | Surface resistivity (Ω/□) | Optical permeability (%) | Retardation (nm) | Surface resistivity (Ω/□) | Optical permeability (%) |
| XI-1 | 240 | 1.4 | 480 | 70 | 80 | 475 | 69 | 80 |
| XI-2 | 220 | 1.4 | 490 | 68 | 81 | 485 | 68 | 81 |

TABLE XI-(3)-continued

| | | | | Characteristics of phase differential substrate of electrode for liquid crystal | | | | |
| --- | --- | --- | --- | --- | --- | --- | --- | --- |
| | | | | Before heating | | After heating (180° C. × 1 hr) | | |
| Experimental No. | Stretching temperature (°C.) | Stretching ratio | Retardation (nm) | Surface resistivity (Ω/□) | Optical permeability (%) | Retardation (nm) | Surface resistivity (Ω/□) | Optical permeability (%) |
| XI-3 | 210 | 1.4 | 500 | 70 | 79 | 490 | 68 | 81 |
| XI-4 | 200 | 1.4 | 480 | 71 | 80 | 475 | 68 | 80 |
| XI-5 | 190 | 1.4 | 490 | 70 | 81 | 485 | 69 | 82 |

EXAMPLE XII

Experiments where the molecular weight of the polycarbonate is varied

EXPERIMENTAL NOS. XII-1 and XII-2

(a) Preparation of polymer for substrate film for liquid crystal

The aromatic polycarbonate having 1,1-bis(4-hydroxyphenyl)-3,3,5-trimethylcyclohexane and bisphenol A (molar ratio=7:3) as bisphenol components shown in Table XII-(1), and the weight-average molecular weight shown in Table XII-(1), was prepared, and Tg thereof was measured. The results are shown in Table XII-(1).

TABLE XII-(1)

| Experimental No. | Weight-average molecular weight of aromatic polyester*[21] | Characteristics of polymer Tg (°C.) |
| --- | --- | --- |
| XII-1 | 90,000 | 205 |
| XII-2 | 58,000 | 205 |

*[21]Aromatic polyester in which diol components are 1,1-bis(4-hydroxyphenyl)-3,3,5-trimethylcyclohexane and bisphenol A (molar ratio = 7:3)

(b) Preparation of substrate film for liquid crystal

A methylene chloride solution of the polymer blend (concentration=15% by weight) was prepared, and a polymer film (containing residual methylene chloride) was prepared in the same manner as in Experimental No. I-1.

(With respect to retardation appeared by applying load at the time of drying the polymer film)

The polymer film was dried and the retardation of the polymer film to which the load of 0 g, 68 g or 135 g was applied at the drying step was measured, in the same manner as in Experimental No. I-1 except that the drying temperature shown in Table XII-(2) was employed. The results are shown in Table XII-(2), respectively.

(With respect to retardation appeared by applying load to substrate film for liquid crystal)

The polymer film was dried in the same manner as in Experimental No. I-1 except that the drying temperature was that shown in Table XII-(2), to give a substrate film for liquid crystal. Also, the retardation of the substrate film for liquid crystal was measured in the same manner as in Experimental No. I-1 by applying the load of 0 g, 250 g or 500 g to substrate film for liquid crystal. The results are shown in Table XII-(2), respectively.

TABLE XII-(2)

| | Retardation appeared by applying load at the time of drying the polymer film (nm) | | | | | Retardation appeared by applying load to substrate film for liquid crystal (nm) | | | | |
| --- | --- | --- | --- | --- | --- | --- | --- | --- | --- | --- |
| | Drying temperature (°C.) | | Load at the time of drying | | | Drying temperature (°C.) | | Load at the time of measuring | | |
| Experimental No. | First step | Second step | 0 g | 68 g | 135 g | First step | Second step | 0 g | 250 g | 500 g |
| XII-1 | 120 | 170 | 0 | 6 | 10 | 120 | 170 | 0 | 11 | 19 |
| XII 2 | 120 | 170 | 0 | 5 | 10 | 120 | 170 | 0 | 10 | 20 |

(c) Stretching of substrate film for liquid crystal

A phase differential substrate film for liquid crystal was prepared and the retardation thereof was measured in the same manner as in Experimental No. I-1 except that the stretching temperature and the stretching ratio shown in Table XII-(3) were employed. The results are shown in Table XII-(3).

(d), (e) Formation of barrier layer and transparent electrode for liquid crystal A barrier layer and a transparent electrode were formed on one side of the phase differential substrate film for liquid crystal to prepare a phase differential substrate of electrode for liquid crystal in the same manner as in Experimental No. I-1.

A surface electrical resistance and optical permeability of the phase differential substrate of electrode for liquid crystal, and a retardation, surface electrical resistance and optical permeability of the phase differential substrate of electrode for liquid crystal which was heat-treated in the same manner as in Experimental No. I-1 were measured in the same manner as in Experimental No. I-1. The results are shown in Table XII-(3).

TABLE XII-(3)

| | | | | Characteristics of phase differential substrate of electrode for liquid crystal | | | | |
|---|---|---|---|---|---|---|---|---|
| | | | | Before heating | | After heating (180° C. × 1 hr) | | |
| Experimental No. | Stretching temperature (°C.) | Stretching ratio | Retardation (nm) | Surface resistivity (Ω/□) | Optical permeability (%) | Retardation (nm) | Surface resistivity (Ω/□) | Optical permeability (%) |
| XII-1 | 210 | 1.4 | 480 | 70 | 81 | 475 | 68 | 80 |
| XII-2 | 216 | 1.4 | 490 | 70 | 82 | 485 | 68 | 82 |

EXAMPLE XIII

Experiment where undercoat layer is provided

EXPERIMENTAL NO. XIII-1

The phase differential substrate film of electrode for liquid crystal was prepared in the same manner as in Experimental No. I-1.

The coating solution of silane coupling agent, formulation thereof being described below, was applied to one surface of the phase differential substrate film of electrode for liquid crystal with #2 bar coater, and after being allowed to stand for 3 minutes, the film was dried for 10 minutes at 120° C. to give an undercoat layer.

(Formulation of the coating solution of silane coupling agent)

Silane coupling agent of 2 parts by weight NIPPON YUNICAR (A-1110)

Hexane 100 parts by weight

A barrier layer and a transparent electrode for liquid crystal were provided in the same manner as in Experimental No. I-1 on the surface of the undercoat layer to give a phase differential substrate of electrode. A surface electrical resistance and optical permeability thereof were measured in the same manner as in Experimental No. I-1. Also, after heat-treatment of the phase differential substrate of electrode in the same manner as in Experimental No. I-1, the substrate was cooled to room temperature, and then a retardation, surface electrical resistance and optical permeability thereof were measured. The results are shown in Table XIII.

EXPERIMENTAL NO. XII-2

The phase differential substrate of electrode was prepared in the same manner as in Experimental No. XIII-1 except that the undercoat layer was changed to silicone-hard-coat-type undercoat layer, and then the same measurements as in Experimental No. XIII-1 were carried out. The results are shown in Table XIII.

Besides, the silicone-hard-coat-type undercoat layer was formed in such a manner that a primer (PH 91) (solid content=4% by weight) of Toshiba Silicone Co., Ltd. was applied with #2 bar coater, and after drying for 10 minutes at 100° C., a solution which was separately prepared by diluting 10 parts by weight of hard-coat-agent (TOSGUARD 520) (solid content=20% by weight) with 70 parts by weight of isopropyl alcohol was applied with #8 bar coater, and subsequently the coating was dried for 5 minutes at 100° C., and further for another 10 minutes at 180° C.

EXPERIMENTAL NO. XIII-3

The phase differential substrate of electrode for liquid crystal was prepared in the same manner as in Experimental No. VII-1.

A substrate of electrode for liquid crystal was prepared by using the phase differential substrate film for liquid crystal in the same manner as in Experimental No. XIII-1 (stretching temperature and stretching ratio thereof being described in Table XIII), and then the same measurements as in Experimental No. XIII-1 were carried out. The results are shown in Table XIII.

EXPERIMENTAL NO. XIII-4

The phase differential substrate of electrode for liquid crystal was prepared in the same manner as in Experimental No. VII-1.

A substrate of electrode for liquid crystal was prepared by using the phase differential substrate film for liquid crystal in the same manner as in Experimental No. XIII-2 (stretching temperature and stretching ratio thereof being described in Table XIII), and then the same measurements as in Experimental No. XIII-2 were carried out. The results are shown in Table XIII.

TABLE XIII

| | | | | Characteristics of phase differential substrate of electrode for liquid crystal | | | | |
|---|---|---|---|---|---|---|---|---|
| | | | | Before heating | | After heating (180° C. × 1 hr) | | |
| Experimental No. | Stretching temperature (°C.) | Stretching ratio | Retardation (nm) | Surface resistivity (Ω/□) | Optical permeability (%) | Retardation (nm) | Surface resistivity (Ω/□) | Optical permeability (%) |
| XIII-1 | 275 | 1.4 | 500 | 72 | 80 | 500 | 70 | 81 |
| XIII-2 | 275 | 1.4 | 500 | 70 | 80 | 500 | 69 | 80 |
| XIII-3 | 240 | 1.4 | 480 | 71 | 79 | 475 | 70 | 80 |
| XIII-4 | 240 | 1.4 | 490 | 70 | 80 | 485 | 69 | 80 |

INDUSTRIAL APPLICABILITY

The substrates of electrode for liquid crystal of the present invention are usable for plastic substrates of transparent electrode for liquid crystal display of downsized and light electrical or electronic apparatuses.

We claim:

1. A substrate of electrode for liquid crystal which comprises a substrate film for liquid crystal comprising an aromatic polyester which contains, as a bisphenol component, at least one selected from the group consisting of 1,1-bis(4-hydroxyphenyl)-alkylcycloalkane, 1,1-bis(3-substituted-4-hydroxyphenyl)-alkylcycloalkane and 1,1-bis(3,5-substituted-4-hydroxyphenyl)-alkylcycloalkane, and a transparent electrode for liquid crystal which is provided on at least one surface of the film.

2. The substrate of electrode for liquid crystal of claim 1, wherein said substrate film for liquid crystal comprises a mixture of the aromatic polyester and a polycarbonate.

3. The substrate of electrode for liquid crystal of claim 1 or 2, wherein said bisphenol component is 1,1-bis(4-hydroxyphenyl)-3,3,5-trimethylcyclohexane.

4. The substrate of electrode for liquid crystal of claim 1 or 2, a retardation of said substrate film for liquid crystal is not more than 20 nm measured under unloaded condition.

5. The substrate of electrode for liquid crystal of claim 1 or 2, wherein said substrate film for liquid crystal is a phase differential film having a retardation of 100 to 1,200 nm measured under unloaded condition.

6. The substrate of electrode for liquid crystal of claim 1 or 2, wherein a barrier layer is provided between the substrate film for liquid crystal and the transparent electrode.

7. The substrate of electrode for liquid crystal of claim 6, wherein the barrier layer comprises a high molecular weight material.

8. The substrate of electrode for liquid crystal of claim 7, wherein the high molecular weight material is ethylene-vinyl alcohol copolymer or poly(vinylidene chloride).

9. The substrate of electrode for liquid crystal of claim 6, wherein the barrier layer comprises an inorganic material.

10. The substrate of electrode for liquid crystal of claim 9, wherein the inorganic material is $SiO_x$, SiN or SiAl ON.

11. The substrate of electrode for liquid crystal of claim 6, wherein an undercoat layer is provided between the barrier layer and the substrate film for liquid crystal.

12. The substrate of electrode for liquid crystal of claim 11, wherein the undercoat layer comprises at least one of a silane coupling agent and a silicone hard coat.

13. The substrate of electrode for liquid crystal of claim 11, wherein the undercoat layer comprises epoxy resin.

14. A substrate of electrode for liquid crystal which comprises a substrate film for liquid crystal comprising a polycarbonate which contains, as a bisphenol component, at least one selected from the group consisting of 1,1-bis(4-hydroxyphenyl)-alkylcycloalkane, 1,1-bis(3-substituted-4-hydroxyphenyl)-alkylcycloalkane and 1,1-bis(3,5-substituted-4-hydroxyphenyl)-alkylcycloalkane, and a transparent electrode for liquid crystal which is provided on at least one surface of the film.

15. The substrate of electrode for liquid crystal of claim 14, wherein said substrate film for liquid crystal contains a polycarbonate other than said polycarbonate.

16. The substrate of electrode for liquid crystal of claim 14 or 15, wherein said bisphenol component is 1,1-bis(4-hydroxyphenyl)-3,3,5-trimethylcyclohexane.

17. The substrate of electrode for liquid crystal of claim 14 or 15, a retardation of said substrate for liquid crystal is not more than 20 nm measured under unloaded condition.

18. The substrate of electrode for liquid crystal of claim 14 or 15, wherein said substrate film for liquid crystal is a phase differential film having a retardation of 100 to 1,200 nm measured under unloaded condition.

19. The substrate of electrode for liquid crystal of claim 14 or 15, wherein a barrier layer is provided between the substrate film for liquid crystal and the transparent electrode.

20. The substrate of electrode for liquid crystal of claim 19, wherein the barrier layer comprises a high molecular weight material.

21. The substrate of electrode for liquid crystal of claim 20, wherein the high molecular weight material is ethylene-vinyl alcohol copolymer or poly(vinylidene chloride).

22. The substrate of electrode for liquid crystal of claim 19, wherein the barrier layer comprises an inorganic material.

23. The substrate of electrode for liquid crystal of claim 22, wherein the inorganic material is $SiO_x$, SiN or SiAl ON.

24. The substrate of electrode for liquid crystal of claim 19, wherein an undercoat layer is provided between the barrier layer and the substrate film for liquid crystal.

25. The substrate of electrode for liquid crystal of claim 24, wherein the undercoat layer comprises at least one of a silane coupling agent and a silicone hard coat.

26. The substrate of electrode for liquid crystal of claim 24, wherein the undercoat layer comprises epoxy resin.

* * * * *